United States Patent
Bruce

(10) Patent No.: US 12,548,235 B2
(45) Date of Patent: Feb. 10, 2026

(54) GRAPHICS PROCESSING

(71) Applicant: Arm Limited, Cambridge (GB)

(72) Inventor: Richard Edward Bruce, Great Shelford (GB)

(73) Assignee: Arm Limited, Cambridge (GB)

( * ) Notice: Subject to any disclaimer, the term of this patent is extended or adjusted under 35 U.S.C. 154(b) by 178 days.

(21) Appl. No.: 18/457,660

(22) Filed: Aug. 29, 2023

(65) Prior Publication Data

US 2024/0078741 A1   Mar. 7, 2024

(30) Foreign Application Priority Data

Sep. 6, 2022 (GB) ...................................... 2213007

(51) Int. Cl.
  *G06T 15/06*  (2011.01)
  *G06T 15/00*  (2011.01)

(52) U.S. Cl.
  CPC ............ *G06T 15/06* (2013.01); *G06T 15/005* (2013.01); *G06T 2210/52* (2013.01)

(58) Field of Classification Search
  None
  See application file for complete search history.

(56) References Cited

U.S. PATENT DOCUMENTS

| | | | |
|---|---|---|---|
| 5,197,140 A | 3/1993 | Balmer | |
| 5,588,152 A | 12/1996 | Dapp et al. | |
| 7,353,369 B1 | 4/2008 | Coon et al. | |
| 7,999,808 B1 | 8/2011 | Aila et al. | |
| 8,072,454 B1 | 12/2011 | Aila et al. | |
| 10,964,086 B2 | 3/2021 | Croxford et al. | |
| 11,315,303 B2 | 4/2022 | Saeed et al. | |
| 2004/0125103 A1 | 7/2004 | Kaufman | |
| 2008/0079713 A1 | 4/2008 | Mejdrich | |
| 2009/0262132 A1 | 10/2009 | Peterson | |
| 2009/0295805 A1* | 12/2009 | Ha | G06T 15/50 345/426 |
| 2011/0069067 A1 | 3/2011 | Ozdas et al. | |

(Continued)

FOREIGN PATENT DOCUMENTS

| | | |
|---|---|---|
| EP | 3675046 A1 | 1/2020 |
| JP | 2001148028 A | 5/2001 |

(Continued)

OTHER PUBLICATIONS

Combined Search and Examination Report under Sections 17 and 18(3) dated Nov. 10, 2021, GB Patent Application No. GB2108050.2.

(Continued)

*Primary Examiner* — Andrew G Yang
(74) *Attorney, Agent, or Firm* — Pearl Cohen Zedek Latzer Baratz LLP

(57) ABSTRACT

Disclose herein is a method of operating a graphics processor when performing ray tracing. During a traversal of the nodes of an acceleration data structure, when a parent node that encompasses multiple child node volumes is encountered, a group of rays is tested against the child node volumes to determine which child nodes may need to be visited next. Rather than simply visiting the nodes based on the order in which they are found to be interested, the node traversal order is instead determined based on the group of rays.

18 Claims, 12 Drawing Sheets

(56) References Cited

U.S. PATENT DOCUMENTS

| | | | |
|---|---|---|---|
| 2012/0050289 A1* | 3/2012 | Park | G06T 17/005 |
| | | | 345/426 |
| 2014/0168228 A1 | 6/2014 | Luebke et al. | |
| 2014/0168238 A1 | 6/2014 | Luebke et al. | |
| 2015/0262408 A1 | 9/2015 | Lee et al. | |
| 2016/0350960 A1 | 12/2016 | Yi et al. | |
| 2019/0035138 A1* | 1/2019 | Fuetterling | G06T 15/06 |
| 2019/0057539 A1* | 2/2019 | Stanard | B29C 63/36 |
| 2022/0391216 A1 | 12/2022 | Bruce et al. | |
| 2022/0392145 A1 | 12/2022 | Bruce | |
| 2022/0392146 A1 | 12/2022 | Bruce et al. | |
| 2022/0392147 A1 | 12/2022 | Bruce | |
| 2023/0298127 A1* | 9/2023 | Barczak | G06T 1/60 |
| | | | 345/531 |

FOREIGN PATENT DOCUMENTS

| | | | |
|---|---|---|---|
| WO | 2014068400 A2 | 5/2014 | |
| WO | 2016060874 A1 | 4/2016 | |

OTHER PUBLICATIONS

Search Report under Section 17 dated Dec. 7, 2021, GB Patent Application No. GB2108052.8.
Combined Search and Examination Report under Section 17 and 18(3) dated Dec. 9, 2021, GB Patent Application No. GB2108053.6.
Search Report under Section 17(6) dated Jun. 6, 2022, GB Patent Application No. GB2108053.6.

* cited by examiner

GRAPHICS PROCESSING

BACKGROUND

The technology described herein relates to graphics processing systems, and in particular to the rendering of frames (images) for display.

FIG. 1 shows an exemplary system on-chip (SoC) graphics processing system 8 that comprises a host processor in the form of a central processing unit (CPU) 1, a graphics processor (GPU) 2, a display processor 3 and a memory controller 5.

As shown in FIG. 1, these units communicate via an interconnect 4 and have access to off-chip memory 6. In this system, the graphics processor 2 will render frames (images) to be displayed, and the display processor 3 will then provide the frames to a display panel 7 for display.

In use of this system, an application 13 such as a game, executing on the host processor (CPU) 1 will, for example, require the display of frames on the display panel 7. To do this, the application will submit appropriate commands and data to a driver 11 for the graphics processor 2 that is executing on the CPU 1. The driver 11 will then generate appropriate commands and data to cause the graphics processor 2 to render appropriate frames for display and to store those frames in appropriate frame buffers, e.g. in the main memory 6. The display processor 3 will then read those frames into a buffer for the display from where they are then read out and displayed on the display panel 7 of the display.

One rendering process that may be performed by a graphics processor is so-called "ray tracing". Ray tracing is a rendering process which involves tracing the paths of rays of light from a viewpoint (sometimes referred to as a "camera") back through sampling positions in an image plane into a scene, and simulating the effect of the interaction between the rays and objects in the scene. The output data value for a sampling position in the image (plane), is determined based on the object(s) in the scene intersected by the ray passing through the sampling position, and the properties of the surfaces of those objects. The ray tracing calculation is complex, and involves determining, for each sampling position, a set of objects within the scene which a ray passing through the sampling position intersects.

FIG. 2 illustrates an exemplary "full" ray tracing process. A ray 20 (the "primary ray") is cast backward from a viewpoint 21 (e.g. camera position) through a sampling position 22 in an image plane (frame) 23 into the scene that is being rendered. The point 24 at which the ray 20 first intersects an object 25, e.g. a primitive (which primitives in the present embodiments are in the form of triangles, but may also comprise other suitable geometric shapes), in the scene is identified. This first intersection will be with the object in the scene closest to the sampling position. A secondary ray in the form of shadow ray 26 may be cast from the first intersection point 24 to a light source 27. Depending upon the material of the surface of the object 25, another secondary ray in the form of reflected ray 28 may be traced from the intersection point 24. If the object is, at least to some degree, transparent, then a refracted secondary ray may be considered.

Ray tracing is considered to provide better, e.g. more realistic, physically accurate images than more traditional rasterisation rendering techniques, particularly in terms of the ability to capture reflection, refraction, shadows and lighting effects. However, ray tracing can be significantly more processing-intensive than traditional rasterisation.

The Applicants have recognised therefore that there remains scope for improved techniques for performing ray tracing using a graphics processor.

BRIEF DESCRIPTION OF THE FIGURES

Embodiments of the technology described herein will now be described by way of example only and with reference to the accompanying drawings, in which.

Like reference numerals are used for like elements in the Figures where appropriate.

DESCRIPTION

Figure 1:
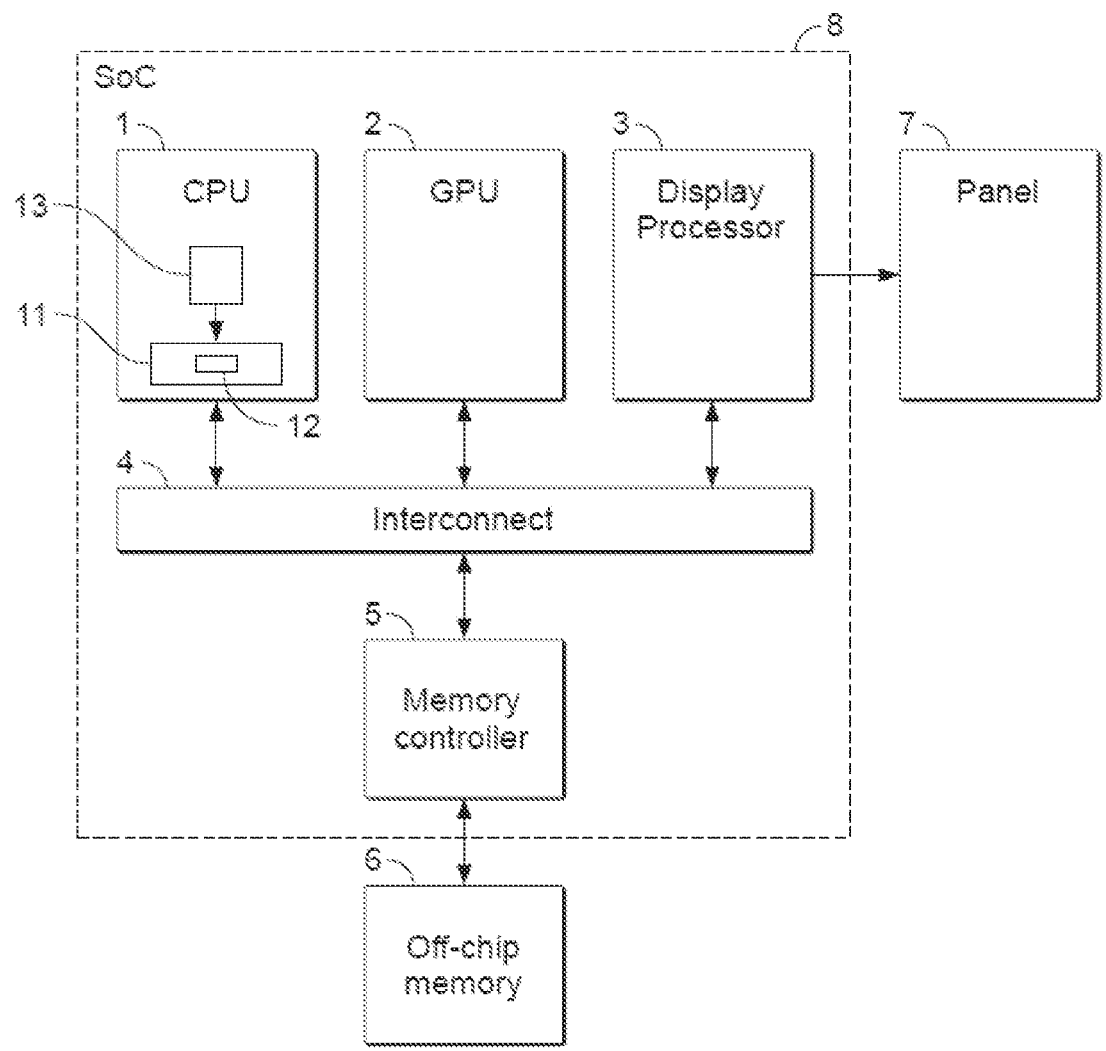
FIG. 1 shows an exemplary graphics processing system.

A first embodiment of the technology described herein comprises a method of operating a graphics processor when performing ray tracing, wherein the ray tracing uses a ray tracing acceleration data structure indicative of the distribution of geometry to be rendered to determine geometry that may be intersected by a ray being used for a ray tracing operation, the ray tracing acceleration data structure comprising a plurality of nodes, each node representing a respective volume, at least one node of the ray tracing acceleration data structure comprising a "parent" node being associated with a respective set of plural child nodes, wherein the volume represented by the parent node encompasses the respective volumes for each of its plural child nodes;

the method comprising:

performing a traversal operation comprising traversing the ray tracing acceleration data structure for a group of plural rays together such that all of the rays in the group of rays visit the nodes of the ray tracing acceleration data structure in the same node order, wherein when the traversal operation encounters a parent node, an intersection testing operation is performed for the group of rays in respect of the parent node comprising testing at least one ray in the group of rays for intersection with one or more of the respective volumes for the child nodes associated with the parent node to determine which of the child nodes represent volumes containing geometry that may be intersected by at least one ray in the group of rays, the method further comprising:

when the testing that is performed for the group of rays in respect of a parent node determines that the respective volumes for multiple ones of the child nodes associated with the parent node are intersected:

determining, based on the group of rays, an order in which the child nodes whose volumes were found to be intersected by at least one ray in the group of rays during the testing of the parent node should be visited, wherein determining the order in which the child nodes should be visited comprises at least selecting a first child node from the child nodes whose volumes were found to be intersected by at least one ray in the group of rays during the testing of the parent node that should be visited first; and the traversal operation continuing by visiting the selected first child node.

A second embodiment of the technology described herein comprises a graphics processor that is operable to perform a ray tracing process, wherein the ray tracing process uses a ray tracing acceleration data structure indicative of the distribution of geometry to be rendered to determine geometry that may be intersected by a ray being used for a ray tracing operation, the ray tracing acceleration data structure comprising a plurality of nodes, each node representing a respective volume, at least one node of the ray tracing acceleration data structure comprising a "parent" node being associated with a respective set of plural child nodes, wherein the volume represented by the parent node encompasses the respective volumes for each of its plural child nodes;

the graphics processor comprising:

a traversal circuit that is configured to perform, for a group of plural rays, a traversal operation comprising traversing the ray tracing acceleration data structure for the group of plural rays together such that all of the rays in the group of rays visit the nodes of the ray tracing acceleration data structure in the same node order, wherein when the traversal operation encounters a parent node, an intersection testing operation is performed for the group of rays in respect of the parent node comprising testing at least one ray in the group of rays for intersection with one or more of the respective volumes for the child nodes associated with the parent node to determine which of the child nodes represent volumes containing geometry that may be intersected by at least one ray in the group of rays;

the graphics processor further comprising:

a traversal optimisation circuit that is configured to:

when a group of plural rays is performing a traversal of the ray tracing acceleration data structure; and when the testing of rays in the group of plural rays that are performing the traversal together in respect of a parent node determines that the respective volumes for multiple ones of the child nodes associated with the parent node are intersected:

determine, based on the group of rays, an order in which the child nodes whose volumes were found to be intersected by at least one ray in the group of rays during the testing of the parent node should be visited, wherein determining the order in which the child nodes should be visited comprises at least selecting a first child node from the child nodes whose volumes were found to be intersected by at least one ray in the group of rays during the testing of the parent node that should be visited first; and cause the traversal operation to continue by visiting the selected first child node.

The technology described herein broadly relates to the performing of ray tracing on a graphics processor, e.g., and in an embodiment, in order to render a frame that represents a view of a particular scene. For ease of explanation various embodiments will be described in the context of rendering a frame that represents a view of a scene using a ray tracing process but the render output in general may be any suitable and desired render output that may be generated using a ray tracing process.

When performing a ray tracing operation, for each ray that is being used to render a sampling position in the render output (e.g. a frame that is being rendered), in order to render the sampling position, it first needs to be determined which geometry that is defined for the render output (e.g. scene) is intersected by the ray (if any).

There are various ways in which this can be done, as desired. However, in general, there may be many millions of graphics primitives within a given scene, and millions of rays to be tested, such that it is not normally practical to test every ray against each and every graphics primitive. To speed up the ray tracing operation the technology described herein therefore uses a ray tracing acceleration data structure, such as a bounding volume hierarchy (BVH), that is representative of the distribution of the geometry in the (e.g.) scene that is to be rendered to determine the intersection of rays with geometry (e.g. objects) in the scene being rendered (and then render sampling positions in the output rendered frame representing the scene accordingly).

The ray tracing operation according to the technology described herein therefore generally comprises performing a traversal of the ray tracing acceleration data structure for a plurality of rays that are being used for the ray tracing process, which traversal involves testing the rays for intersection with the volumes represented by the different nodes of the ray tracing acceleration data structure in order to determine with reference to the node volumes which geometry may be intersected by which rays for a sampling position in the render output (e.g. the frame for the scene) that is being rendered, and which geometry therefore needs to be further processed for the rays for the sampling position.

The ray tracing acceleration data structure traversal operation therefore involves traversing the nodes of the ray tracing acceleration data structure, testing rays for intersection with the volumes associated with the nodes, and maintaining a record of which node volumes are intersected by which rays, e.g. to determine which nodes should therefore be tested next for the rays, and so on, down to the end nodes, e.g., at the lowest level, of the ray tracing acceleration data structure.

For example, and in an embodiment, the ray tracing acceleration data structure comprises a tree structure that is configured such that each end (e.g. leaf) node of the tree structure represents a set of geometry (e.g. primitives) defined within the respective volume that the end (e.g. leaf) node corresponds to, and with the other (non-leaf) nodes representing hierarchically-arranged larger volumes up to a root node at the top level of the tree structure that represents an overall volume for the render output (e.g. scene) in question that the tree structure corresponds to. Each non-leaf node is therefore in an embodiment a parent node for a respective set of plural child nodes with the parent node volume encompassing the volumes of its respective child nodes. In an embodiment, each (non-leaf) node is therefore associated with a respective plurality of child node volumes, each representing a (in an embodiment non-overlapping) sub-volume within the overall volume represented by the (non-leaf) node in question.

In this case, the ray tracing acceleration data structure can thus be (and in an embodiment is) traversed by proceeding down the "branches" of the tree structure and testing the rays against the child volumes associated with a node at a first level of the tree structure to thereby determine which child nodes in the next level of the tree structure should be tested, and so on, down to the level of the respective end (e.g. leaf) nodes at the end of the branches of the tree structure.

In the technology described herein, at least one of the nodes of the ray tracing acceleration data is thus associated with a respective set of plural child nodes. In an embodiment there are multiple such nodes in the ray tracing acceleration data structure. These nodes will be referred to as "parent" nodes herein (although they could also be referred to an "internal" or "non-leaf" nodes, for example, depending on the arrangement of the ray tracing acceleration data structure). The ray tracing acceleration data structure thus in an embodiment comprises at least some "parent" nodes being associated with a respective set of plural child nodes, wherein the volume represented by the parent node encompasses the respective volumes for each of its plural child nodes.

The traversal operation in general comprises testing rays in the group of plural rays performing the traversal operation together against respective nodes of the acceleration data structure to determine geometry (e.g. for the scene) that may be intersected by at least on ray in the group of rays.

Accordingly, when the traversal operation encounters such parent node, it is therefore generally necessary to test the rays for which the traversal is being performed against the child node volumes associated with the node to thereby determine a corresponding result of the intersection testing for the child nodes of the node in question. The result of this intersection testing then controls how the traversal operation proceeds. Thus, for any child node that was found to be intersected by a ray, the traversal should then proceed to test the ray against that child node, and so on, down to the end (e.g. leaf) nodes, at which point the ray should be tested for intersection with the actual geometry (e.g. primitives) represented by the end (e.g. leaf) node.

The traversal operation thus generally proceeds by continuing to traverse the ray tracing acceleration data structure such that the group of rays that are performing the traversal together is then tested against a child node whose volume was found to be intersected by at least one ray in the group of rays during the testing of the parent node.

Once it has been determined by performing such a traversal operation for a ray which end (e.g. leaf) nodes represent geometry that may be intersected by a ray, the actual geometry intersections for the ray for the geometry that occupies the volumes associated with the intersected end (e.g. leaf) nodes can be determined accordingly, e.g. by testing the ray for intersection with the individual units of geometry (e.g. primitives) defined for the render output (e.g. scene) that occupy the volumes associated with the end (e.g. leaf) nodes. Thereafter, once the geometry intersections for the rays being used to render a sampling position have been determined, it can then be (and is) determined what appearance the sampling position should have, and the sampling position rendered accordingly.

In this respect, it will be appreciated that the ray-primitive intersection testing is generally relatively more computationally expensive. The use of the ray tracing acceleration data structure in the technology described herein therefore allows the ray tracing operation to be accelerated.

For instance, rather than testing a ray against each and every individual primitive within the render output (e.g. scene), a ray that is being used for the ray tracing process can instead be tested for intersection at a higher level against the volumes represented at each level of the tree data structure, and for any rays that do not intersect a given node in a particular branch of the tree structure it can be determined that the ray does not intersect the geometry falling within the branch of the tree structure including that node, without further testing of the ray against the geometry in the lower levels of the tree "branch" in question.

The use of such a ray tracing acceleration data structure in the technology described herein can therefore be effective in speeding up the overall ray tracing operation.

However, the Applicants have recognised that there is still scope for improvement in this regard.

In particular, according to the technology described herein, rather than performing a traversal of the ray tracing acceleration data structure for an individual ray, a group of plural rays are caused to perform the traversal operation together, such that all of the rays in the group of rays traverse (i.e. visit) the nodes of the ray tracing acceleration data structure in the same node order.

This has the effect and benefit that multiple rays in the group of plural rays that are performing the traversal at the same time can then be tested against a given node of the ray tracing acceleration data structure in one testing instance, thus reducing the number of memory access operations.

For instance, this means that where there are multiple rays in the group of plural rays that should be tested for a given node, all of those rays can potentially be tested against the node in a single testing instance. Correspondingly this then means that the graphics processor is able to load in all of the data for those rays from memory in one go, e.g. in a single memory load operation.

Likewise, the result of the intersection testing can be returned for all of the rays (and all of the volumes) being tested, and then stored accordingly.

In this way it is possible to reduce the overall number of memory access operations that may be required for testing all of the rays, e.g. at least compared to other possible arrangements where the traversal and ray-volume testing is performed in respect of individual rays, and which arrangements may therefore require a significant number of memory accesses for loading in (and subsequently writing out) the required data for each of the rays for each instance of intersection testing.

This also therefore allows processing resource for the group of rays to be shared. For instance, and in an embodiment, by performing the traversal operation for a group of rays together, the traversal operation can thus be managed using a single, common data structure (a 'traversal record') for the group of rays that tracks which nodes are associated with geometry that is potentially intersected by the rays in the group of rays (and which nodes/geometry thus needs to be tested (next) for the traversal operation).

Again, this can further reduce memory bandwidth since there is in embodiments a single data structure (e.g. a common record of which nodes (geometry) are potentially intersected by rays in the group of rays, which record may generally take any suitable form but is in an embodiment is in the form of a 'stack') that manages the traversal operation for the whole group of rays, thus reducing the number of memory accesses, e.g. compared to other possible arrangements wherein respective data structures (e.g. stacks) are provided for the individual rays, e.g. as may be required if the rays are performing the traversal operation independently.

The approach according to the technology described herein where a traversal is performed for a group of plural rays together can therefore provide various benefits, e.g., and especially, in terms of reducing memory bandwidth, even if it means that some rays in the group are caused to perform part of a traversal when they could in principle have been terminated earlier (e.g. since the ray did not intersect a higher level node, and so the traversal could have been terminated for that ray, but the ray nonetheless continues the traversal as part of the group).

The present Applicants have now recognised that it may be possible to further optimise the traversal operation based on the group of rays, e.g., and in an embodiment, based on properties of and/or relating to the rays in the group of rays that are being tested, e.g. to try to visit the nodes in an optimised order to make the overall traversal more efficient.

In particular, as mentioned above, when performing a traversal operation, when the traversal encounters a parent (e.g. non-leaf) node that is associated with a set of plural child node volumes, the testing that should be performed for a ray involves testing the ray for intersection with one or more of the respective child node volumes associated with the parent (e.g. non-leaf) node in question ('ray-volume' intersection testing) to determine which child node volumes are intersected by the ray, and therefore contain geometry that is potentially intersected by the ray.

Accordingly, when the traversal operation is performed for a group of rays, the testing that is performed for the group of rays in respect of a parent (e.g. non-leaf) node correspondingly involves testing at least one of the rays in the group for intersection with one or more of the respective child node volumes associated with the parent (e.g. non-leaf) node in question to determine which child node volumes are intersected by the at least one ray in the group of rays, and therefore contain geometry that is potentially intersected by a ray in the group of rays.

The testing that is performed for a group of rays in respect of a parent (e.g. non-leaf) node in embodiments comprises testing all of the rays in the group of rays against the parent (e.g. non-leaf) node. Thus, in some embodiments, when the traversal operation encounters a parent node, the testing that is performed for the group of rays in respect of the parent node comprises testing each of the rays in the group of rays for intersection with one or more of the respective volumes for the child nodes associated with the parent node being tested to thereby determine which of the child nodes represent volumes containing geometry that may be intersected by at least one ray in the group of rays.

In other embodiments however the testing that is performed for a group of rays in respect of a parent (e.g. non-leaf) node may comprise testing a set of less than all of the rays in the group, e.g., and in particular, a set of 'active' rays in the group. For example, as described above, a traversal record is maintained for the traversal operation, which traversal record is in an embodiment shared by the group of rays and used to control the traversal operation. It may also be tracked during the traversal operation (using the traversal record, or otherwise) which rays in the group of plural rays actually need to be tested against which of the nodes of the ray tracing acceleration data structure. For instance, this information may be tracked using a suitable 'active mask' (e.g. bit mask) indicating which rays in the group of rays should be tested against a corresponding parent (e.g. non-leaf) node that is included in the traversal record for testing.

Thus, the testing in respect of a given (parent) node may in embodiments be performed (only) for the set of rays in the group that are indicated to be tested in respect of that node (and are therefore 'active' in respect of that node). Various arrangements would be possible in this regard.

As discussed above, the testing that is performed for a group of rays in respect of a parent node generally comprises testing at least one ray in the group of rays (and in an embodiment all, or all 'active', rays in the group of rays) for intersection with the respective child node volumes of the parent node. For instance, the testing that is performed for an individual ray in respect of a parent (e.g. non-leaf) node comprises intersection testing the ray against one or more of the child node volumes associated with the parent (e.g. non-leaf) node. The result of this testing is in an embodiment to determine an intersection testing result for each respective child node (i.e. whether or not the ray intersects the child node volume).

This testing may thus comprise testing the ray against each of the child node volumes, one after another. For instance, in general, it may be necessary to test a ray against each of the respective child node volumes at least in order to determine a respective result for each child node. For example, if a ray does not in fact intersect any of the child node volumes, the ray must be (and will be) tested against each of the child node volumes to determine that is the case. Likewise, in order to determine which child nodes represent geometry that is potentially intersected by a ray, in general it is necessary to determine all possible ray-volume intersections at each level of the ray tracing acceleration data structure. Thus, in embodiments, a ray may (always) be tested against each of the respective child node volumes to determine a respective ray-volume intersection testing result for each child node. This may also be appropriate for example where the ray-volume testing is performed conservatively, e.g. at relatively lower precision, such that a ray may in principle be determined to intersect multiple child node volumes (even though the ray in fact should only intersect one of the child node volumes).

On the other hand, if a ray is found to intersect a particular child node volume, in some cases there may then be no need to continue testing against any other child node volumes that have not yet been tested, e.g., and in particular, if it can be determined that the ray will only intersect that child node volume (e.g. based on the ray's direction of travel and the relative arrangement of the child node volumes). In some cases therefore the testing of a ray against child node volumes may be stopped once a (e.g. the first) intersection has been found. In that case, the intersection testing result may be implicitly null for some of the child node volumes (in which case those child node volumes may not need to be explicitly tested).

Various other arrangements would however be possible in this regard for determining which child node volumes are intersected and in general the ray-volume intersection testing for an individual ray against a particular child node volume may be performed in any suitable manner as desired, e.g. in the normal manner for ray tracing arrangements.

After performing the desired ray-volume intersection testing against the child node volumes associated with the parent node, any child nodes whose volumes are found to be intersected by a ray for which the traversal operation is being performed may potentially need to be further tested (as they may contain geometry that is intersected by a ray and so should be further tested to determine whether or not the geometry is intersected by the ray), and so on, down the end (e.g. leaf) nodes that represent the actual geometry at the lowest level of the ray tracing acceleration data structure.

Thus, after the ray-volume intersection testing using the child node volumes associated with a given parent node is completed, if any one or more of the rays in the group of rays is found to intersect ('hit') any one or more of the child node volumes, the traversal operation should then proceed to further test the group of rays against the child nodes whose volumes were found to be intersected, and each child node that was determined to be intersected should in an embodiment therefore be added to the traversal record accordingly to allow the traversal operation to subsequently test the group of rays against that child node. Thus, any and all child nodes whose volumes are found to be intersected by a ray during the testing of the associated parent node are in an embodiment added to the traversal record for further testing.

The further testing that is performed in respect of a child node will depend on the type of node. For example, if the child node is an end (e.g. leaf) node, the testing that will be performed in an embodiment comprises testing the ray for intersection against the actual geometry, e.g., primitives, represented by the node ('ray-primitive' intersection testing) to determine which (if any) geometry (e.g. primitives) are actually intersected by the ray. On the other hand, if the child node is another internal i.e. parent (non-leaf) node, the testing that is performed in respect of the child node in an embodiment again comprises testing the rays against its respective child node volumes to determine which nodes represent geometry that is potentially intersected by the rays, and so on, in the same manner described above, with the traversal operation continuing accordingly.

In this respect, the traversal operation of the technology described herein in an embodiment proceeds by traversing "branches" of the ray tracing acceleration data structure to their end, e.g. rather than attempting to test against all nodes at a particular level of the ray tracing acceleration data structure. In other words, if the testing in respect of a given parent node determines that two (or more) of its associated child nodes should be tested, this is in an embodiment then noted in the traversal record accordingly, and the traversal then proceeds to visit a first one of the child nodes of the parent node in question. The first one of the child nodes is then tested accordingly. As noted above, when the first one of the child nodes is itself a parent node, the testing that is performed in respect of the first one of the child nodes may accordingly determine a further set of child nodes that need to be tested, at the next level of the ray tracing acceleration data structure. In that case, rather than testing a second one of the child nodes of the initial parent node, the traversal operation is in an embodiment configured to next visit the child nodes of the first one of the child nodes, and so on, so that the traversal operation in an embodiment continues traversing the ray tracing acceleration data structure down to an end (e.g. leaf) node.

This arrangement can generally be more efficient than attempting to traverse many branches of the ray tracing acceleration data structure in parallel. For instance, if it is determined that a ray intersects geometry within the first branch that is tested, this may have the effect of terminating the ray, which can then save the ray having to traverse other parts of the ray tracing acceleration data structure.

The present Applicants recognise in this regard that the order in which the intersected child nodes are visited during the traversal can therefore be optimised, e.g., and in an embodiment, to increase the probability of hitting geometry (e.g. a primitive) (sooner).

For example, when testing a ray that will terminate on hitting geometry (e.g. a 'closest hit' ray such as a primary, reflection or refraction ray), it may be preferable to try to test the ray against relatively closer child node volumes first, since in that case, if the ray hits geometry (e.g. a primitive) within a closer child node volume, it may not be necessary to test against further away child node volumes since if the ray hits geometry (e.g. a primitive) in the closer child node volume it will not then propagate into further way volumes, such that the length (maximum range) of the ray can effectively be shortened, which in turn may save the ray having to traverse some of the ray tracing acceleration data structure.

Thus, when the testing that is performed in respect of a given parent node determines that multiple child node volumes associated with the parent node are intersected by a ray, such that the traversal should proceed to test against multiple ones of the child nodes, rather than simply visiting the child nodes in the order in which they are obtained for the parent node (e.g. the order in which they are stored, e.g. in memory) the present Applicants recognise that it may be beneficial to try to test, e.g., closer child node volumes first, since if there is a hit against geometry (e.g. a primitive) within a closer child node volume, that can then be used to avoid further testing against other child node volumes that are further away. This can therefore improve the overall efficiency of the traversal operation.

This optimisation may be relatively straightforward when performing a traversal for an individual ray since the distance between each ray and each child node volume will generally be known.

However, in the technology described herein, as explained above, the traversal operation is performed for groups of plural rays together. The technology described herein thus aims to determine, for a group of rays as a whole, an order in which the traversal operation should visit the child nodes in order to try to improve the overall efficiency of the traversal operation.

Thus, in the situation where the testing that is performed for a group of rays in respect of a parent node determines that the respective volumes for multiple ones of the child nodes associated with the parent node being tested are intersected, such that the traversal operation may correspondingly need to test the group of rays against the multiple ones of the child nodes, the technology described herein determines, based on the group of rays, an order in which the child nodes whose volumes were found to be intersected by at least one ray in the group of rays during the testing of the parent node should be visited by at least selecting a first one of the child nodes whose volume was found to be intersected by at least one ray in the group of rays during the testing of the parent node that the traversal operation should visit. The traversal operation then continues by visiting the selected first one of the child nodes.

In particular, the traversal operation continues by visiting the selected one of the child nodes first such that the selected one of the child nodes is visited before any other of the multiple ones of the child nodes whose volume was found to be intersected by at least one ray in the group of rays during the testing of the parent node. For example, where the traversal operation proceeds down "branches" of the tree as mentioned above, the selected first one of the child nodes is in an embodiment the next node that is visited during the traversal operation. Thus, in embodiments, determining the order in which the child nodes should be visited comprises at least selecting a first child node from the child nodes whose volumes were found to be intersected by at least one ray in the group of rays during the testing of the parent node that should be visited first, and the traversal operation continues by visiting the selected first node next. In that case, the group is rays is in an embodiment tested against the selected child node directly after the testing of the parent node (without any other nodes being visited first).

In some embodiments the technology described herein determines an overall order in which the child nodes whose volumes were found to be intersected by at least one ray in the group of rays during the testing of the parent node should be visited for the group of rays as a whole. That is, where the testing determines that first, second, etc., child node volumes are intersected, the technology described herein may determine which of the child nodes out of the first, second, etc., child nodes whose volumes were found to be intersected should be visited first, and also determine which of the child nodes out of the first, second, etc., child nodes whose volumes were found to be intersected should be visited second, etc., The traversal operation can then be, and is in an embodiment, performed to visit the nodes according to the determined order (although it will be appreciated that the traversal may also, and in embodiments typically will, visit other nodes in between, e.g., and particularly, where the traversal operation proceeds by following each "branch" to its respective end node). Thus, the child nodes may (e.g.) be added to the traversal record according to the determined order.

In other embodiments however the technology described herein simply selects a first child node from the plurality of child nodes whose volumes were found to be intersected by at least one ray in the group of rays during the testing of the parent node to visit and the other child nodes are visited (if necessary) in any order, e.g. in the order in which they are obtained. Various arrangements would be possible in this regard.

Subject to the requirements of the technology described herein, the determination of the order in which the child nodes whose volumes were found to be intersected by at least one ray in the group of rays during the testing of the parent node should be visited (and hence selection of the child node to be visited first) may be performed in any suitable and desired manner.

According to the technology described herein this determination (the selection of the 'first' child node) is generally made based on the group of rays for which the traversal operation is being performed. For example, as mentioned above, the determination of the node traversal order is in an embodiment made based on one or more properties of and/or related to individual rays in the group of rays. In embodiments the determination of the node traversal order is also based on properties of and/or related to the multiple ones of the child node volumes that were found to be intersected. In some embodiments, the determination of the node traversal order is made based on interactions between the at least one ray in the group of rays for which the testing is being performed and the one or more child node volumes, as will be explained further below.

The determination (selection) is in an embodiment made based on all of the rays in the group of rays, or least based on all of the rays in the set of rays that are currently 'active' in respect of the parent node being tested (e.g. as indicated using an active mask, described above).

Various arrangements are contemplated in this regard. For example, in embodiments, after testing the (active) rays in the group against one or more child node volumes associated with the parent node that is being tested to determine which child node volumes are intersected, it is then determined which of the rays in the group of rays have been found to intersect a child node volume, and the determination (selection) as to which child node to visit first is then performed based on the set of rays that actually intersect a child node volume (which may therefore be a subset of less than all of the rays that were tested against the child node volumes). Thus, if only one ray in the group of rays that was tested against the parent node is found to intersect a child node volume, the determination is in some embodiments made based on that ray (alone). On the other hand, and in general, when multiple rays are found to intersect a child node volume, the determination is in an embodiment made based on considering multiple rays. Various other arrangements would be possible. For example, in some embodiments, all of the rays in the group may be tested against the child node volumes (with no attempt to track which rays are 'active') in which case the determination (selection) is in an embodiment correspondingly made based on all of the rays in the group.

In the typical case where the determination of the node traversal order is made based on considering multiple rays in the group of rays, in embodiments a "consensus" based approach is used in which a determination is first made in respect of each of the individual rays as to which child node should be visited first, and the results from the individual rays are then suitably aggregated or used together to determine (select) the child node that should be visited first for the group of rays as a whole. Thus, each ray that is used for the determination in an embodiment "votes" for a child node that should be visited first and these votes are then suitably combined to determine the child node that should be visited first for the group of rays as a whole.

Thus, in embodiments, it is in an embodiment first determined for a (single), and in an embodiment for plural, and in an embodiment for each (or at least each active), ray in the group of plural rays which of the child node volumes should desirably be visited next based on that ray, with the results for at least one, and in an embodiment for plural, and in an embodiment for all, of the rays in the group of plural rays then being aggregated and/or used together to determine the order in which the child nodes should be tested against for the group of rays.

The determination of which child node should desirably be visited first (e.g. next) for a given ray in the group of plural rays may be determined in various suitable manners, as desired. Correspondingly, the aggregation of the per-ray results for the group of plural rays to determine the desired node traversal order for the group of rays can be performed in any suitable and desired manner.

To this end, the technology described herein proposes a number of suitable heuristics that can be used to determine which child node should be visited first for a group of plural rays, as will be explained further below.

A first consideration is that the child nodes associated with a given parent node may comprise a mixture of different types of nodes. For example, the set of child nodes associated with a given parent node may include further parent nodes which are in turn associated with their own respective sets of child nodes at the next level of the ray tracing acceleration data structure. However, the set of child nodes associated with a given parent node may also include one or more end (e.g. leaf) nodes representing actual geometry (e.g. primitives) for the render output. In that case, the traversal operation of the technology described herein is in an embodiment configured to test any end (e.g. leaf) nodes first. This is beneficial because it may help keep the traversal record (e.g. stack) shorter. At least for rays that will terminate on hitting geometry (e.g. a primitive) (e.g. a "primary" ray), this also allows the possibility for the ray lengths to be shortened (thus potentially allowing part of the ray tracing acceleration data structure to be culled).

Thus, in embodiments, when the set of child nodes associated with the parent node being tested includes one or more end (e.g. leaf) child nodes representing actual geometry (e.g. primitives) that has been defined for the render output and one or more child nodes that do not represent actual geometry that has been defined for the render output (e.g. non-leaf nodes), and wherein the testing that is performed for the group of rays in respect of the parent node determines that the multiple ones of the child nodes whose respective volumes are intersected include one or more end child nodes and one or more non-end child nodes, the traversal operation continues by visiting the end child nodes first. Thus, when the set of child nodes associated with the parent node being tested includes a mixture of end nodes and non-end nodes, the end nodes are in an embodiment visited first (before any non-end nodes).

Thus, in embodiments, determining an order in which the child nodes whose volumes were found to be intersected by at least one ray in the group of rays during the testing of the parent node should be visited comprises first selecting any end nodes, such that the traversal operation continues to visit the selected end child nodes first. Where there are plural end child nodes these may be visited in any suitable and desired order, e.g. the order in which they are obtained. For instance, where there are plural end child nodes these will in general all need to be visited and tested, and so the order in which the end child nodes are visited may not matter (so long as the end nodes are in an embodiment tested before any non-end child nodes). Correspondingly, if all of the child nodes associated with a particular parent node are end child nodes there may therefore be no need to determine a node traversal order for the end child nodes (although this could be done), as all of the end child nodes should in an embodiment be tested.

Accordingly, as alluded to above, the technology described herein is particularly useful when the child nodes include at least some nodes that are themselves parent nodes, as in this case the traversal order may be optimised to try to increase the likelihood of a ray hitting geometry which may in turn allow some of the ray tracing acceleration data structure to be culled. The technology described herein in an embodiment therefore applies to parent nodes having at least some child nodes that are not end nodes, i.e. child nodes that are themselves parent nodes for further respective sets of child nodes in a lower level of the ray tracing acceleration data structure.

For instance, where there are a mix of end nodes and non-end nodes, an initial determination is in an embodiment made based on the types of child node that are determined to be intersected by at least one ray, in an embodiment such that any end child nodes representing actual geometry are visited first (before the non-end nodes). However, where there are (also) plural non-end nodes whose volumes were found to be intersected by at least one ray in the group of rays during the testing of the parent node, a (further) determination is then performed to determine an order in which any non-end nodes whose volumes were found to be intersected by at least one ray in the group of rays during the testing of the parent node should be visited. Thus, determining the order in an embodiment comprises selecting a first one of the non-end nodes to visit. For a set of plural child nodes to be tested (that are not end nodes), a number of main embodiments are contemplated for determining which of the child nodes should be selected as the first child node as will be explained further below.

For example, in some embodiments, a simple 'hit count' may be used to determine which of the child nodes the traversal operation should visit first. Thus, in an embodiment, it is tracked how many rays within the group of rays intersect (hit) each of the child node volumes, and the child node that is intersected by the most rays is selected to be visited first. In this case, when two (or more) child nodes have the same number of hits any suitable tie-breaking criteria may be used. For example, as a simple tie-breaking criterion, the child node that is stored first may be selected. However, the tie-breaking criteria may be more or less complex as desired and may take into account any suitable properties of and/or relating to the rays or child node volumes that are being tested.

The traversal operation in an embodiment then continues by visiting the child node that was found to have the most hits. In an embodiment, after following the "branch" of the tree including the selected first child node, the traversal operation then continues by visiting the child node found to have the next most number of hits, and so on.

In this case, the property that is used to select the first child node to visit is essentially the number of rays that intersect the respective child node volumes.

Thus, in embodiments, the step of determining, based on the group of rays, an order in which the child nodes whose volumes were found to be intersected by at least one ray in the group of rays during the testing of the parent node should be visited is performed using a hit count based on the number of rays determined to intersect each of the child node volumes.

For instance, when performing the testing in respect of a parent node, a count may be kept of how many rays within the group of rays being tested intersect the different respective child node volumes associated with the parent node, and the first one of the child nodes is selected based on/using the number of rays that intersect each child node, and in an embodiment such that the child node that is intersected by the most rays is visited first. Thus, in embodiments of this approach, determining the order comprises determining the child node that is intersected by the greatest number of rays. In an embodiment, the child node that is intersected by the greatest number of rays is selected to be visited earlier, e.g., and in an embodiment, as the first child node (unless there are any end nodes that should be visited first).

This approach can work well to keep the most rays 'active' for the traversal. That is, this approach may help to maximise the number of potential hits when the rays are subsequently tested against the selected child node.

However, this approach does not take into account the distance between the rays and the child node volumes. Thus, if the child node with the most hits is relatively far away from the origin of a particular ray, and there are other closer child node volumes, the ray may still need to be tested against the closer child node volumes (e.g. if the ray is a 'closest hit' ray, that should only be terminated for the first geometry it hits within the scene, rather than a ray that should be terminated on any geometry hits), even if the ray is found to hit geometry (e.g. a primitive) within the selected first child node where the first child node is selected on the basis of being the child node with the most hits.

In other embodiments it may be preferred therefore to take into account the distance between the rays and the child node volumes, e.g. to try to increase the likelihood of being able to shorten the length (maximum range) of a ray. Thus, in embodiments, the distance to the child node volumes is determined for each ray that is being tested, and the globally closest child node volume (the child node volume that has the shortest distance to the ray origin for any one of the rays being tested) is selected to be visited first. To do this, it is therefore necessary to load in the ray origin co-ordinates, etc., and compute the distances between the ray and the child node volume boxes. In this respect, it will be appreciated however that it may not be necessary to read in the ray co-ordinates in full precision at this point, since the heuristics are merely attempting to optimise the traversal order. This can therefore help simplify these computations.

Thus, in embodiments, the step of determining, based on the group of rays, an order in which the child nodes whose volumes were found to be intersected by at least one ray in the group of rays during the testing of the parent node should be visited is performed using a distance between an origin of the at least one ray for which the testing is being performed and one or more of the child node volumes. In that case, determining the order in an embodiment comprises determining the child node comprises determine which of the child node volumes is closest to the origin of a ray for which the testing is being performed. In an embodiment, the child node whose volume is closest to the origin of the at least one ray is selected to be visited earlier (e.g. first)). In an embodiment the distance is used to determine the child node volume having the shortest (line of sight) distance to one of the rays in the group of rays (the globally closest child node volume for the plural rays being tested).

In one embodiment, this approach therefore visits the globally closest child node volume earlier (e.g. first) but does not take into account how many rays hit that child node volume. That is, in embodiments, the distances between the origins of the rays and the one or more child node volumes are determined for each ray for which testing is being performed, and wherein the child node whose volume is globally closest to one of the rays for which the testing is being performed is selected as the first child node. Thus, even if only a single ray hits the closest child node volume, that child node will be visited. This means that the other rays will be caused to visit that node even though it is already determined that none of the other rays intersect any geometry represented by that node.

In another embodiment, each ray is considered to "vote" for the child node volume that it is closest to (e.g. with each ray having a single vote). Thus, in embodiments, rather than simply selecting the globally closest child node, it is determined for multiple rays in the group of rays that are performing the traversal operation together which of the child nodes is closest to the respective ray, and the child node that is closest to the most rays is selected to be visited first. Thus, in embodiments, each ray for which testing is being performed votes for the child node that is closest to the origin of the ray, and the child node with the most votes is selected as the first child node. In this case, the determination (selection) of the order in which the child nodes should be visited may generally be based on the distances between the rays and the child node volumes and also on the number of hits.

For instance, in one embodiment of this approach, each ray may have a single vote. This approach could also be further refined by applying weighted voting so that each ray "votes" for its preferred order of visiting the child nodes. For example, each ray may have its own preferred order of visiting the child nodes, e.g., and in an embodiment, based on the relative distances between the ray's origin and the respective child node volumes. Each ray may therefore rank the respective child node volumes accordingly. Thus, in embodiments, each ray for which testing is being performed ranks the one or more child nodes based on the respective distances from the origin of the ray to the child node volume, and wherein child node rankings for multiple rays are used together to select the first child node.

Each ray may therefore be considered to effectively vote for multiple different child nodes but with the votes being suitably weighted (e.g., linearly, or exponentially), e.g. so that the closest node to the ray is weighted higher than the next closest node, and so on. The ranked votes from the plural rays being tested can then be aggregated or used together in order to determine an overall ranking order in which the child nodes should be visited (and hence to select the child node to be visited first). This has been found to work well.

As a further example, the determination (selection) may also take into account the 'type' of rays that are being tested. For example, where a group of rays to be tested includes a mix of, e.g., rays that terminate on first hit (e.g. primary rays), and other rays (e.g. that do not terminate on first hit), greater weighting may be given to the rays that terminate on first hit. For instance, in some cases, any rays that do not terminate on first hit may be effectively zero weighted such that they are ignored for the purposes of selecting the child node that is to be visited first, to try to optimise the traversal for rays that will terminate on first hit.

Various other arrangements would of course be possible including any suitable and desired combinations of the above heuristics.

Thus, in embodiments, the step of determining, based on the group of rays, an order in which the child nodes whose volumes were found to be intersected by at least one ray in the group of rays during the testing of the parent node should be visited is performed using one or more of: (i) a child node 'type' (in particular whether the child node represents geometry); (ii) a hit count based on the number of rays determined to intersect each of the child node volumes; (iii) a respective distance (e.g. a shortest distance) between an origin of a ray being tested and a child node volume; and (iv) a ray 'type' (in particular whether the ray terminates on first hitting geometry). Where the determination uses a distance between an origin of a ray being tested and a child node volume this in an embodiment involves considering the respective distances between each of the rays being tested and each of the one or more child node volumes. For example, this in an embodiment involves ranking the child nodes in order of their distance to respective rays for which the testing is being performed and either selecting the child node that is globally closest to a ray or the child node that is closest to the greatest number of rays.

The determination of the order in which the child nodes should be visited may also use any other suitable and desired properties of and/or relating to the rays or the child node volumes. For example, other properties that could be taken into account may include the size/shape of the child node volumes, the relative likelihood of a ray intersecting geometry within the child node volume, etc., The heuristics described above may in embodiments be applied for all of the rays in the group of rays, regardless of which rays have actually been found to intersect any of the child node volumes. This may simplify the implementation. In some embodiments however, as contemplated above, which of the rays in the group of rays have been found to intersect at least one of the child node volumes is tracked (and only the rays that have been found to intersect at least one of the child node volumes is considered when selecting which child node volume to visit first). Thus, the rays that are considered when determining the traversal order may in some cases be a subset of less than all of the rays in the group of rays that are performing the traversal operation together, e.g., and in an embodiment, the subset of rays that have been found to intersect one of the child node volumes during the testing of the parent node in question.

Various other arrangements would be possible in this regard.

The effect of all this is to determine for the group of rays an order in which the child nodes should be visited during the traversal operation, in particular by selecting, in the case where multiple ones of the child node volumes associated with the parent node being tested are found to be intersected by a ray, which one of the child nodes should be visited first. The traversal operation in an embodiment then proceeds by visiting the selected child node, and so on. As mentioned above, the testing that is performed in respect of the selected child node will depend on the type of node. For instance, if the selected child node is also a parent node for a further set of child nodes, the testing is in an embodiment performed in a similar manner as described above, to determine which one of the further set of child nodes associated with the selected child node should be visited first (e.g. next).

Thus, whilst embodiments are described above for ease of explanation in relation to testing of a single parent node it will be appreciated that the traversal operation may, and in general will, involve testing many such parent nodes, which testing is in an embodiment performed in the same manner described above.

Depending on the final result of testing the selected child node, in some cases the other child nodes whose volumes were found to be intersected during the testing of the associated parent node may or may not need to be tested, e.g. if the ray is determined to intersect geometry (e.g. a primitive) associated with the selected child node, the ray may in some cases then be terminated early, without having to test against the other (further away) child node volumes.

In other cases however once the traversal has tested against the selected first child node (and potentially tested against its respective child nodes, etc.), the other child nodes whose volumes were found to be intersected during the testing of the associated parent node may also need to be tested.

The other child nodes whose volumes were found to be intersected during the testing of the associated parent node may be tested in any suitable and desired order. For example, as mentioned above, the technology described herein may in some embodiments simply select a child node to visit first, with the other child nodes simply then being visited (if required) in the order in which they are stored for the parent node, without attempting to optimise the full traversal order. It is also contemplated however that the determination of the traversal order may comprise determining the full order in which the child nodes whose volumes were found to be intersected during the testing of the associated parent node should be visited. Depending on the heuristic that is used this may be simple to do. For example, the heuristic may naturally rank all of the child nodes, e.g. in terms of their hit count. In that case, the nodes may be placed into the traversal record (e.g. stack) in the desired order. For instance, an ordering buffer may be used to facilitate this, with the child nodes being placed into the ordering buffer as and when they are found to be intersected, and then written out from the buffer into the traversal record according to the determined order.

Various other arrangements would be possible in this regard.

In this way, by attempting to optimise the order in which the child node volume intersection testing is performed for a group of rays, the technology described herein can provide an overall more efficient ray tracing process, e.g. with reduced cycle count.

The technology described herein may therefore provide various benefits compared to other approaches.

The technology described herein may be particularly beneficial for rays that will terminate on first hitting geometry (e.g. a primitive) (e.g. a 'closest hit' ray such as a primary, reflection or refraction ray), since in that case the traversal order may be optimised to try to increase the likelihood of a ray hitting geometry (e.g. a primitive) sooner which in turn can allow some of the ray tracing acceleration data structure to be culled. Thus, the group of rays in an embodiment includes at least one (and in an embodiment multiple) rays that terminate on hitting geometry within the scene, e.g., and in an embodiment, rays that terminate on the first (closest) hit.

For other rays, e.g. shadow rays, that may terminate on hitting any geometry (such that the ray may be terminated on any geometry hit, regardless of whether that geometry is the first (closest) geometry in the scene hit by the ray), optimising the traversal order to visit the closest nodes first may have lesser benefit, and in that case it may be preferred to consider only the global hit count, for example. That is, which heuristic is to be applied may in embodiments also take into the account the type(s) of rays in the group of rays being tested.

Thus, in embodiments, there may be a plurality of available heuristics that may be applied to determine the node traversal order, and the method may comprise (the graphics processor) selecting one or more heuristics from the plurality of available heuristics, e.g., and in an embodiment, based on the type(s) of rays in the group of rays being tested.

Alternatively, there may be a single heuristic (or set of heuristics) that is available to be applied to all groups of rays. In that case, depending on the types of rays being tested, the different heuristics of the technology described herein may have greater or lesser benefit. The technology described herein may however still be applied to such rays and there may be benefit in doing this at least in some situations. Thus, in some embodiments, the technology described herein is always applied to determine the node traversal order. In other embodiments, the technology described herein may be selectively enabled (or disabled), e.g., for different types of rays.

Various arrangements would be possible in this regard.

The technology described herein in embodiments relates to the situation where a frame that represents a view of a scene comprising one or more objects is being rendered using a ray tracing process.

In this process, the frame that is being rendered will, and in an embodiment does, comprise an array of sampling positions, and a ray tracing process will be used to render each of the sampling positions so as to provide an output frame (an image) that represents the desired view of the scene (with respective rays that are cast corresponding to and being used when rendering and to render respective sampling positions for the frame).

The technology described herein can be used for any form of ray tracing based rendering.

Thus, for example, the technology described herein can be used for and when a "full" ray tracing process is being used to render a scene, i.e. in which so-called "primary" rays are cast from a view point (the camera) through a sampling position in the image frame to determine the intersection of that ray with objects in the scene, e.g., and in an embodiment, to determine, for each ray, a closest object in a scene that the ray intersects (a "first intersection point" of the ray). The process may involve casting further (secondary) rays from the respective first intersection points of primary rays with objects in the scene, and additionally using the intersection data for the secondary rays in determining the rendering of the sampling positions.

In this case, the operation in the manner of the technology described herein may be, and is in an embodiment, used when and for analysing the intersections of both primary and secondary rays with objects in the scene.

The technology described herein can also be used for so-called "hybrid" ray tracing rendering processes, e.g. in which both ray tracing and rasterisation processes are performed when performing rendering (e.g. in which only some of the steps of a full ray tracing process are performed, with a rasterisation process or processes being used to implement other steps of the "full" ray tracing process). For example, in an exemplary hybrid ray tracing process, the first intersection of each of the primary rays with objects in the scene may be determined using a rasterisation process, but with the casting of one or more further (secondary) rays from the determined respective first intersection points of primary rays with objects in the scene then being performed using a ray tracing process.

In this case, the graphics processor operation in the manner of the technology described herein may be, and is in an embodiment, used when and for analysing the intersections of the secondary rays with objects in the scene.

Subject to the requirements of the technology described herein, the graphics processor may be operated to perform the ray tracing operation in any suitable manner as desired.

Correspondingly, the graphics processor may be configured in any suitable and desired manner. In embodiments, the graphics processor comprises a programmable execution unit operable to execute programs to perform graphics processing operations, and in which a program can in an embodiment be executed by groups of plural execution threads together.

The ray-tracing based rendering of a frame that is performed in the technology described herein in that case is in some embodiments triggered and performed by the programmable execution unit of the graphics processor executing a graphics processing program that will cause (and that causes) the programmable execution unit to perform the necessary ray tracing rendering process.

Thus, a graphics shader program or programs, including a set (sequence) of program instructions that when executed will perform the desired ray tracing rendering process, will be issued to the graphics processor and executed by the programmable execution unit. The shader program(s) may include only instructions necessary for performing the particular ray tracing based rendering operations, or it may also include other instructions, e.g. to perform other shading operations, if desired.

Subject to the particular operation in the manner of the technology described herein, the execution of the shader program to perform the desired ray tracing process can otherwise be performed in any suitable and desired manner, such as, and in an embodiment, in accordance with the execution of shader programs in the graphics processor and graphics processing system in question.

The shader program may trigger the desired ray tracing rendering process in various suitable manners. For instance, in an embodiment, the ray tracing traversal operation including any required intersection testing could be performed entirely by the shader program. However in a typical ray tracing rendering process there will be many instances of intersection testing that is required. Thus, in some embodiments, at least some, and in some cases all, of the traversal operation may be performed using dedicated circuits within the graphics processor. In that case, appropriate instructions may be included into the shader program to trigger the programmable execution unit to message the appropriate circuit to perform the required ray tracing operations.

For example, in one embodiment, a dedicated set of one or more 'ray-volume' testing instructions are provided that can be included within a shader program for the ray tracing operation, and which set of instructions cause the graphics processor to perform the required intersection testing between at least one ray in the group of rays that are performing the traversal together and one or more child node volumes associated with a parent node. Thus, whenever ray-volume intersection testing is required in respect of a parent node, the appropriate instruction(s) can be included appropriately into the generated shader program to cause the graphics processor to performed the required intersection testing. This may be by the programmable execution unit being caused to message an appropriate (ray-volume) intersection testing circuit, but could also be by the shader program jumping to an appropriate intersection testing subroutine, etc., as desired. In other embodiments instructions may be included that trigger an entire ray tracing traversal. Various arrangements are contemplated in this regard for managing the traversal operation.

As described above, the ray tracing traversal operation is performed for groups of plural rays together. This can be managed in various ways but in some embodiments is managed by also including in the program one or more instructions that cause a group of execution threads, with each thread corresponding to a ray in the group of plural rays, to be and remain in an 'active' state (e.g. a state in which processing operations can be performed using the group of threads as a whole, e.g. with processing resource shared across the thread groups, e.g., a single instruction, multiple data (SIMD) execution state) until all of the rays in the group of rays that are performing the traversal operation together have completed the traversal operation. This could be achieved in any suitable manner, as desired. For example, the program instructions may be arranged such that the threads in the group are not caused to diverge, or be terminated, until the traversal operation for the group of rays is complete. Or, explicit instructions (or modifiers) may be used to force the threads to remain in the active state.

Thus, the graphics processor (the programmable execution unit of the graphics processor) will operate to execute the shader program(s) that includes a sequence of instructions to perform the desired ray tracing rendering process, for plural, and in an embodiment for each, sampling position, of the frame that is to be rendered.

Correspondingly, when executing the ray tracing shader program, the graphics processor will operate to spawn (issue) respective execution threads for the sampling positions of the frame being rendered, with each thread then executing the program(s) so as to render the sampling position that the thread represents (and corresponds to). The graphics processor accordingly in an embodiment comprises a thread spawner (a thread spawning circuit) operable to, and configured to, spawn (issue) execution threads for execution by the programmable execution unit.

The ray tracing rendering shader program(s) that is executed by the programmable execution unit can be prepared and generated in any suitable and desired manner.

In an embodiment, it or they is generated by a compiler (the shader compiler) for the graphics processor of the graphics processing system in question (and thus the processing circuit that generates the shading program in an embodiment comprises an appropriate compiler circuit). The compiler is in an embodiment executed on an appropriate programmable processing circuit of the graphics processing system.

In a graphics processing system that is operable in the manner of the technology described herein, in some embodiments at least, a compiler, e.g. executing on a host processor, will generate and issue to the graphics processor one or more shader programs that when executed will perform the required ray tracing-based rendering operations in accordance with the technology described herein, with the graphics processor (the programmable execution unit of the graphics processor) then executing the programs to perform the ray tracing-based rendering.

The compilation process (the compiler) can generate the ray tracing rendering shader program in any suitable and desired manner, e.g., and in an embodiment, using any suitable and desired compiler techniques for that purpose.

Thus, in an embodiment, the shader program is generated by the compiler, and the compiler is arranged to include within the shader program the instructions that are used in the technology described herein. Other arrangements would, of course, be possible.

The generated shader program can then be issued to the programmable execution unit of the graphics processor for execution thereby.

When executing the shader program to perform the ray tracing based rendering process, as it is a ray tracing-based rendering process, the performance of that process will include the tracing of rays into and through the scene being rendered, e.g., and in an embodiment, so as to determine how a given sampling position that the ray or rays in question correspond to should be rendered to display the required view of the scene at that sampling position.

The graphics processor can be any suitable and desired graphics processor. As mentioned above, it in an embodiment includes a programmable execution unit (circuit) that can execute program instructions.

The programmable execution unit can be any suitable and desired programmable execution unit (circuit) that a graphics processor may contain. It should be operable to execute graphics shading programs to perform graphics processing operations. Thus the programmable execution unit will receive graphics threads to be executed, and execute appropriate graphics shading programs for those threads to generate the desired graphics output.

Once a thread has finished its respective processing operation, the thread can then be 'retired', e.g. and a new execution thread spawned in its place.

The graphics processor may comprise a single programmable execution unit, or may have plural execution units. Where there are a plural execution units, each execution unit can, and in an embodiment does, operate in the manner of the technology described herein. Where there are plural execution units, each execution unit may be provided as a separate circuit to other execution units of the data processor, or the execution units may share some or all of their circuits (circuit elements).

The (and each) execution unit should, and in an embodiment does, comprise appropriate circuits (processing circuits/logic) for performing the operations required of the execution unit.

According to the technology described herein the graphics processor and the programmable execution unit are operable to execute shader programs for groups ("warps") of plural execution threads together, e.g. in lockstep, e.g., one instruction at a time. In that case, the execution threads in the execution thread group in an embodiment perform the same traversal operation, but for different rays, e.g., and in an embodiment, in a single instruction, multiple data (SIMD) execution state.

The groups of execution threads can therefore (and do) each process a corresponding group of plural of rays for the ray tracing operation.

According to the technology described herein, the graphics processor is thus configured to, and operable to, group rays (traversal requests) that are to traverse the same acceleration data structure together, so as to execute the traversals of the acceleration data structure for the rays of the group of rays together.

The grouping may be performed in any suitable fashion as desired, but in an embodiment rays that are sufficiently similar to each other and that are to traverse the same acceleration data structure are grouped together, so as to execute the traversals of the acceleration data structure for the rays of the group together. This will help to increase memory locality, and, accordingly, improve the effectiveness of any caching of the ray tracing acceleration data structure (and correspondingly reduce the number of off-chip memory accesses that may be required).

In this case, the rays are in an embodiment grouped together based on their similarities to each other, such that "similar" rays will be grouped together for this purpose. Thus rays are in an embodiment grouped for traversing the (same) ray tracing acceleration data structure together based on one or more particular, in an embodiment selected, in an embodiment predefined criteria, such as one or more of, and in an embodiment all of: the starting positions (origins) for the rays; the directions (direction vectors) of the rays; and the range that the rays are to be cast for.

Thus, in an embodiment, rays can be, and are, grouped together for the ray tracing acceleration data structure traversal process if and when their positions (origins), directions, and/or ranges, are sufficiently similar (e.g., and in an embodiment, are within a particular threshold range or margin of each other) (and the rays are to traverse the same ray tracing acceleration data structure). This will then facilitate performing the ray tracing acceleration data structure traversals for similar rays together, thereby increasing memory access locality, etc., and thus making the ray tracing acceleration data structure traversal operation more efficient.

In order to facilitate this operation, the graphics processor can in an embodiment maintain a "pool" of rays that are waiting to traverse an acceleration data structure (e.g. in an appropriate queue or buffer (cache) on or accessible to the graphics processor), and select groups of one or more rays from that pool for processing, e.g., and in an embodiment, based on one or more or all of the criteria discussed above. A suitable execution thread group may then be spawned for the selected group of rays, and a program executed to cause the group of rays to perform the traversal operation together.

This will then facilitate the ray tracing acceleration data structure traversal processing groups of similar rays together.

The graphics processor correspondingly in an embodiment comprises an appropriate controller operable to select and group rays for which ray tracing acceleration data structure traversals are to be performed from the "pool", and to cause ray tracing acceleration data structure traversals to be performed for groups of rays together.

In this case, rays that are in the "pool" and that are waiting to traverse a ray tracing acceleration data structure in an embodiment have their duration in the pool (their "ages") tracked, with any ray whose duration in the pool exceeds a particular, in an embodiment selected, in an embodiment predetermined, threshold duration ("age"), then being prioritised for processing, e.g., and in an embodiment, without waiting any further for later, "similar" rays to arrive for processing. This will then help to ensure that rays are not retained in the pool for too long whilst waiting for other rays potentially to group with the ray.

The rays in the pool may, for example, be time-stamped for this purpose so that their ages in the pool can be tracked.

Other arrangements would, of course, be possible.

Once a group of rays to be processed together have been selected, then the rays should be processed together as a group, e.g. by spawning a suitable execution thread group, and causing the execution thread group to execute a program that causes the plural rays to traverse the ray tracing acceleration data structure together, in the manner described above.

The groups of rays for which the traversals of the ray tracing acceleration data structure are performed together can comprise any suitable and desired (plural) number of rays, although there may, e.g., and in an embodiment, be a particular, in an embodiment selected, in an embodiment defined, maximum number of rays for which the traversals may be performed together, e.g. depending upon the parallel processing capability of the ray tracing acceleration data structure traversal circuit in this regard.

Other arrangements would, of course, be possible.

Thus, in the technology described herein, the group of one or more execution threads comprises plural execution threads, and corresponds to a thread group (warp) that is executing the program in lockstep. In an embodiment, the group of execution threads comprises more than two execution threads, such as four, eight or sixteen (or more, such as 32, 64 or 128) execution threads.

As mentioned above, the ray tracing operation according to the technology described herein is performed using a ray tracing acceleration data structure. The ray tracing acceleration data structures that are used and traversed in the technology described herein can be any suitable and desired ray tracing acceleration data structures that are indicative of (that represent) the distribution of geometry for a scene to be rendered and that can be used (and traversed) to determine geometry for a scene to be rendered that may be intersected by a ray being projected into the scene.

The ray tracing acceleration data structure in an embodiment represents (a plurality of) respective volumes within the scene being rendered and indicates and/or can be used to determine geometry for the scene to be rendered that is present in those volumes.

The ray tracing acceleration data structure(s) can take any suitable and desired form. In an embodiment the ray tracing acceleration data structure(s) comprise a tree structure, such as a bounding volume hierarchy (BVH) tree. The bounding volumes may be axis aligned (cuboid) volumes. Thus, in one embodiment, the ray tracing acceleration data structure comprises a bounding volume hierarchy, and in an embodiment a BVH tree.

The BVH is a tree structure with primitives (which may be triangles, or other suitable geometric objects) at the leaf nodes. The primitives at the leaf nodes are wrapped in bounding volumes. In an embodiment the bounding volumes are axis aligned bounding boxes. The bounding volumes are then recursively clustered and wrapped in bounding volumes until a single root node is reached. At each level of the recursion two or more bounding volumes may be clustered into a single parent bounding volume. For instance, and in an embodiment, each non-leaf node has a corresponding plurality of child nodes.

In an embodiment the ray tracing acceleration data structure used in the technology described herein comprises a 'wide' tree structure, in which each parent node may be (and in an embodiment is) associated with greater than two child nodes, such as three, four, five, six, or more, child nodes. In an embodiments each parent node may be associated with up to six child nodes. In that case, each instance of ray-volume intersection testing in an embodiment comprises testing one or more rays in the group of plural rays against each of the plural child nodes.

However, other suitable ray tracing acceleration data structures may also be used, as desired. For instance, rather than using a BVH hierarchy, where the scene is subdivided by volume on a per-object basis, e.g. by drawing suitable bounding volumes around subsets of geometry, e.g., and in an embodiment, such that each leaf node (volume) corresponds to a certain number of objects (primitives), the scene could instead be subdivided on a per-volume basis, e.g. into substantially equally sized sub-volumes. For example, the ray tracing acceleration data structure may comprise a k-d tree structure, a voxel (grid hierarchy), etc., as desired. It would also be possible to use 'hybrid' ray tracing acceleration data structures where the scene is subdivided in part on a per-object basis and in part on a per-volume basis. Various other arrangements would be possible and the technology described herein may in general be used with any suitable ray tracing acceleration data structure.

The ray tracing acceleration data structure that is traversed can be generated and provided in any suitable and desired manner. For example, it may be previously determined and provided, e.g., as part of the definition of the scene to be rendered by the application that requires the graphics processing.

In an embodiment, the ray tracing acceleration data structure is generated by the graphics processor itself, e.g. based on an indication of geometry for the scene that is provided to the graphics processor, e.g. in a preliminary processing pass before the scene is rendered.

It could also or instead be generated by a CPU (e.g. host processor), e.g. based on an indication of geometry for the scene, e.g. in a preliminary processing pass before the scene is rendered.

Other arrangements would, of course, be possible.

The ray tracing acceleration data structure can represent and be indicative of the distribution of geometry for a scene to be rendered in any suitable and desired manner. Thus it may represent the geometry in terms of individual graphics primitives, or sets of graphics primitives, e.g. such that each leaf node of the tree structure represents a corresponding subset of the graphics primitives defined for the scene that occupies the volume that the leaf node corresponds to. Additionally or alternatively, the ray tracing acceleration data structure could represent the geometry for the scene in the form of higher level representations (descriptions) of the geometry, for example in terms of models or objects comprising plural primitives.

It would also be possible for a given ray tracing acceleration data structure to represent the geometry in terms of indicating further ray tracing acceleration data structures that need to be analysed. In this case, an initial ray tracing acceleration data structure would, for example, represent further, e.g. finer resolution, ray tracing acceleration data structures that need to be considered for different volumes of the scene, with the traversal of the initial ray tracing acceleration data structure then determining a further ray tracing acceleration data structure or structures that need to be traversed depending upon which volumes for the scene the ray in question intersects.

Thus the ray tracing traversal operation could include transitions between different ray tracing acceleration data structures, such as transitions between different levels of detail (LOD), and/or between different levels of multi-level ray tracing acceleration data structures.

There may also be ray transformations between ray tracing acceleration data structure switches (e.g. such that there is an automatic transition between different ray tracing acceleration data structures with and/or using a transformation of the ray, e.g. described by metadata of or associated with the ray tracing acceleration data structure). For example, a transition between different levels of detail could use an identity transform, and transitions between multi-level ray tracing acceleration data structures could use generic affine transformations of the rays.

Other arrangements would, of course, be possible.

Subject to the requirements of the technology described herein, the traversal operation can otherwise traverse the ray tracing acceleration data structure(s) for a ray in any suitable and desired manner, e.g., and in an embodiment in dependence upon the form of the ray tracing acceleration data structure that is being traversed. The traversal operation will use the information provided about the ray to traverse the ray tracing acceleration data structure to determine geometry for the scene to be rendered that may be intersected by the ray in question.

For example, as mentioned above, the traversal process in an embodiment operates to traverse the ray tracing acceleration data structure to determine for each volume of the scene that the ray passes through in turn, whether there is any geometry in the volume (indicated by the ray tracing acceleration data structure). Thus, the ray tracing acceleration data structure will be traversed based on the position and direction of the ray, to determine whether there is any geometry in the volumes of the scene along the path of the ray (which could, accordingly, then potentially be intersected by the ray). Other arrangements would, of course, be possible.

In an embodiment, the traversal operation traverses the ray tracing acceleration data structure for the path of the ray until a first (potential) intersection with geometry defined for the scene is found for the ray. However, it would also be possible to continue traversal of the ray tracing acceleration data structure after a first (potential) intersection has been found for a ray, if desired.

For example, the ray traversal operation could be (and in an embodiment is) configured and able to discard (ignore) a (potential) intersection and to carry on with the traversal, e.g. depending upon the properties of the geometry for the intersection in question. For example, if a (potentially) intersected geometry is fully or partially transparent, it may be desirable to continue with the traversal (and either discard or retain the initial "transparent" intersection).

Other arrangements would, of course, be possible.

The ray tracing acceleration data structure traversal for a ray could comprise traversing a single ray tracing acceleration data structure for the ray, or traversing plural ray tracing acceleration data structures for the ray. Thus, in an embodiment the ray tracing acceleration data structure traversal operation for a ray comprises traversing plural ray tracing acceleration data structures for the ray, to thereby determine geometry for the scene to be rendered that may be intersected by the ray.

Plural ray tracing acceleration data structures may be traversed for a ray e.g. in the case where the overall volume of, and/or geometry for, the scene is represented by plural different ray tracing acceleration data structures.

Similarly, as discussed above, in one embodiment, a ray tracing acceleration data structure that indicates further ray tracing acceleration data structures to be traversed is used. In this case therefore the ray tracing acceleration data structure traversal circuit will operate to first traverse an initial ray tracing acceleration data structure for the ray to determine one or more further ray tracing acceleration data structures to be traversed for the ray, and to then traverse those determined one or more ray tracing acceleration data structures for the ray, and so on, until an "end" ray tracing acceleration data structure or structures that provides an indication of geometry for the scene to be rendered is traversed for the ray.

The actual intersection testing itself, however this is implemented, can be performed in any suitable fashion, as desired, e.g. in the normal fashion for ray tracing processes.

For instance, the inputs that are provided for the ray-volume intersection testing may and in an embodiment do comprise:

a set of one or more rays from the group of plural rays that are performing the traversal (each ray corresponding to a respective execution thread in the execution thread group); and a parent node of the acceleration data structure that is to be tested for the group of plural rays that are performing the traversal.

Each ray may be, and in an embodiment is, defined in terms of the origin (originating position (e.g. x, y, z coordinates)) for the ray that is to be tested (for which the traversal of the ray tracing acceleration data structure is to be determined); the direction of (a direction vector for) the ray that is to traverse the ray tracing acceleration data structure; and the range (distance) that the ray is to traverse (the (minimum and/or maximum) distance the ray is to traverse into the scene).

As mentioned above, the set of one or more rays that are input for testing may in some embodiments be the set of all of the rays in the group of plural rays. That is, in some cases, the whole group of rays is input for testing, and then tested accordingly. However, in other embodiments, the set of one or more rays that is input for testing comprises a subset of rays from within the whole group of rays, the subset comprising a subset of rays that are to be tested for the node in question (e.g. since they have been found to potentially intersect one or more volumes associated with the node, e.g. in a previous testing instance). This can be indicated appropriately, e.g. using a suitable bit 'mask' that identifies which rays in the group of plural rays should be tested against the node in question.

The parent node is associated with a set of plural child node volumes. The associated volumes are thus also obtained as input for the ray-volume intersection testing. These may be obtained in any suitable fashion. For instance, the node volumes may be stored, e.g. in memory, such that they can be loaded in as required.

The ray-volume intersection testing can then be performed by testing each of the rays in the input set of one or more rays against the one or more volumes associated with the node. This can be done in any suitable manner, as desired, e.g. in the normal way for ray tracing operations.

In embodiments a plurality of rays are tested against a plurality of child volumes associated with a node. This is in an embodiment done in an iterative manner, e.g. by testing a first ray in the group against each of the child volumes in turn, and then moving on to the second ray, and so on, until all of the rays in the group that need to be tested have been tested against all of the child volumes. Various arrangements would be possible in this regard.

In some embodiments the node volumes may be stored, e.g. in memory, in a compressed format. In that case, it may be possible (and beneficial) to perform the intersection testing at a corresponding, lower resolution. In this respect it will be appreciated that there is no harm in performing the ray-volume testing more conservatively (at a lower resolution) during the traversal operation, as the actual ray-primitive intersections will be determined in a subsequent step, e.g. once the traversal is complete and it has been determined which geometry may be intersected.

Once the required intersection testing in respect of a node has completed, the result of the ray-volume intersection testing for the node is then returned as output. The outputted result can then be used by the program that is performing the traversal, e.g. to determine which nodes of the ray tracing acceleration data structure to test next. For example, if it is determined that a particular set of child nodes of the node being tested are potentially intersected by a ray, the outputted result should indicate that set of child nodes, to cause the traversal program to trigger ray-volume intersection with those nodes, and so on.

A suitable traversal record is thus in an embodiment maintained to track and manage which nodes should be tested during the traversal operation. The traversal record thus in an embodiment includes as entries indications of which nodes of the ray tracing acceleration data structure should be tested (i.e. which nodes have volumes for which it has been determined that are intersected by a ray in the group of plural rays performing the traversal operation).

The traversal record may generally take any suitable form, e.g. as may suitable be used for managing such ray tracing traversal operations, but in an embodiment comprises a traversal 'stack', as mentioned above.

Thus, during the traversal operation, when (and whenever) it is determined by an instance of ray-volume testing that a (child) node represents a subset of geometry that may be intersected by a ray in the group of plural rays performing the traversal operation, an indication of, e.g. pointer to, the node is then included into (e.g. pushed to) the traversal record so that the entry can subsequently be read out (popped) from the traversal record by the shader program to cause the rays to be tested against that node, accordingly, and so on.

The traversal record can then be worked through with the record entries being read out (popped) accordingly and provided to the shader program to determine which nodes to be next tested. In the case of a traversal stack, this is in an embodiment managed using a 'last-in-first-out' scheme with the node intersections being pushed to/popped from the stack appropriately. However, various arrangements would be possible in that respect.

The node traversal order is thus generally controlled using the traversal record. Thus, in embodiments, the determination of the node traversal order according to the technology described herein is recorded in the traversal record, e.g. by adding child node volumes to the traversal record according to a desired node traversal order.

The traversal record is then worked through as the traversal program is executed to cause those nodes to be tested. The output of the ray-volume testing is thus in an embodiment returned in the form of an updated state of the traversal record, e.g. indicating which (child) nodes are hit and need to be tested at the next level, and so on.

In the technology described herein the traversal operation is performed for a group of plural rays together. This means that the traversal record can be and in an embodiment is managed for the group of plural rays as a whole (in an embodiment using a set of shared, common registers for the corresponding plurality of execution threads processing the rays in the group of rays). This means that there is no need to load/store individual traversal records for each ray.

For example, and in an embodiment, the traversal record is managed using a set of common registers shared by the execution threads in the group of plural execution threads that are processing the group of plural rays performing the traversal operation. The record is thus the current traversal record loaded into all lanes of one general purpose register. The registers may be configured in any suitable fashion, as desired.

Thus, as well as the programmable execution unit, the graphics processor includes a group of plural registers (a register file) operable to and to be used to store data for execution threads that are executing. Each thread of a group of one or more execution threads that are executing a shader program will have an associated set of registers to be used for storing data for the execution thread (either input data to be processed for the execution thread or output data generated by the execution thread) allocated to it from the overall group of registers (register file) that is available to the programmable execution unit (and to execution threads that the programmable execution unit is executing).

That is, the execution thread group as a whole is in an embodiment also allocated one or more shared, e.g. general purpose, registers, and it is these common registers that are in an embodiment used to manage the traversal record in the technology described herein.

Where there are plural execution units, each execution unit may have its own distinct group of registers (register file). There may also be (and in an embodiment is) a single group of registers (register file) shared between plural (e.g. in an embodiment all) of the separate execution units.

Thus, the result of the ray-volume intersection testing is in an embodiment pushed to the traversal record that is stored using the shared registers. Likewise the traversal record entries are in an embodiment popped from the shared registers. The required push/pop operations for managing the traversal record are in an embodiment implemented, e.g., by performing suitable register shifts.

The group(s) of registers (register file(s)) can take any suitable and desired form and be arranged in any suitable and desired manner, e.g., as comprising single or plural banks, etc., The graphics processor will correspondingly comprise appropriate load/store units and communication paths for transferring data between the registers/register file and a memory system of or accessible to the graphics processor (e.g., and in an embodiment, via an appropriate cache hierarchy).

Thus the graphics processor in an embodiment has an appropriate interface to, and communication with memory (a memory system) of or accessible to the graphics processor.

The memory and memory system is in an embodiment a main memory of or available to the graphics processor, such as a memory that is dedicated to the graphics processor, or a main memory of a data processing system that the graphics processor is part of. In an embodiment, the memory system includes an appropriate cache hierarchy intermediate the main memory of the memory system and the programmable execution unit(s) of the graphics processor.

The traversal program will thus traverse the nodes of the ray tracing acceleration data structure, performing the required ray-volume intersection testing for the nodes at each level of the ray tracing acceleration data structure accordingly to determine with reference to the end (leaf) nodes of the ray tracing acceleration data structure which geometry (if any) may be intersected by the rays in the group of plural rays for which the traversal operation is being performed.

Thus, the ray-volume intersection testing described above is in an embodiment performed, as required, in respect of plural nodes across multiple levels of the ray tracing acceleration data structure, e.g. down to the level of the end (leaf) nodes representing the subsets of geometry defined for the scene.

The end result of this is thus an indication of which geometry (if any) may be intersected by the rays in the group of plural rays.

In the case that the ray was found to intersect a volume of the scene that contains geometry defined for the scene (thus the traversal operation found that there is geometry defined for the scene that the ray potentially intersects), the result (the indication of geometry for the scene to be rendered that may be intersected by the ray) that is returned to the programmable execution unit should, and in an embodiment does, comprise an indication of the defined geometry in the volume or volumes determined to be intersected by the ray. Thus, in the case where a ray is found to intersect a volume that contains defined geometry, then the ray tracing acceleration data structure traversal operation should, and in an embodiment does, return to the programmable execution unit an indication of the geometry for the volume in question.

In this case, the indication of geometry for the scene to be rendered that may be intersected by the ray in question can indicate the geometry that could be intersected for the ray in any suitable and desired manner, e.g., and in an embodiment, in dependence upon the format of the ray tracing acceleration data structure that has been traversed. Thus, this could be in the form of a set of one or more primitives (e.g. points, lines or polygons, such as triangles, etc., and/or spheres, cylinders, cones, etc.) that could be intersected by the ray, and/or some form of higher level definition and/or description of geometry that could be intersected by the ray, for example in the form of more general or generic references to geometry, such as higher order representations of geometry for the scene.

The information that is provided for the (potentially) intersected geometry can take any suitable and desired form, e.g., and in an embodiment, in dependence upon the form of the geometry itself. For example, in the case of a set of primitives (as candidates for intersection), the appropriate primitive identifiers and any associated geometry identifier (e.g. to which they belong) could be returned.

The Applicants recognise that it would also be possible for the traversal for a ray to fail to find any geometry defined for the scene that the ray could potentially intersect, e.g. in the case when none of the volume of the scene that the ray passes through contains any defined geometry for the scene.

In the case that the ray tracing acceleration data structure traversal finds that the ray does not traverse any volume that contains defined geometry for the scene, then the graphics processor in an embodiment returns an appropriate response in that event. In an embodiment, the ray tracing acceleration data structure traversal returns a response indicating that nothing has been intersected by the ray (that no potential intersection has been found) (i.e. that there has been a "miss").

In an embodiment, in response to such a "miss" response from the ray tracing acceleration data structure traversal, the programmable execution unit performs an appropriate particular, in an embodiment selected, in an embodiment predefined, "default" operation for further processing for the sampling position in question in response to that event. This could comprise, for example, assuming intersection with a bounding volume or "skybox" or computing a procedural colour for the background, etc., Various other arrangements would be possible in this regard. The programmable execution unit will then shade the sampling position accordingly.

Thus, in an embodiment, the ray tracing operation acts to (and is configured to) determine whether any of the volumes in the scene represented by the ray tracing acceleration data structure traversed by the ray contain any geometry for the scene, and in the case where the ray does traverse a volume for the scene that contains geometry defined for the scene, returns to the programmable execution unit an indication of the geometry for the volume in question, but where the ray does not traverse any volume that contains geometry defined for the scene, returns to the programmable execution unit an indication of that (a "miss" event).

In an embodiment, once it has been determined which subsets of geometry may be intersected by a ray (from within a group of plural rays), it is then determined which, if any, of the geometry is actually intersected by the ray(s), e.g. by performing suitable ray-geometry intersection testing, as described above.

Thus, for each leaf node (subset of geometry) that may be intersected by a ray or rays, it is then determined which geometry is actually intersected by the rays.

That is, when the traversal operation to determine which geometry may be intersected by the rays in the group of plural rays determines that a particular subset of geometry (represented by leaf node) may be intersected by a ray or rays, the graphics processor then tests the ray or rays for intersection with the individual units of geometry (e.g. primitives) accordingly.

This ray-geometry intersection testing can be done in any suitable fashion as desired, similarly to the ray-volume intersection testing discussed earlier. For instance, this may be done by the programmable execution unit itself or by suitable intersection testing hardware. Where this is performed in hardware, this may be same or different hardware to the intersection testing circuit that performs the ray-volume intersection testing, where this is provided. For instance, in some embodiments, there may be provided dedicated (hardware) circuits for both the ray-volume and ray-primitive intersection testing.

In whatever manner the ray-primitive intersection testing is performed, the end result of all of this is to determine which geometry (if any) is intersected by which rays.

It should be noted in this regard that while the programmable execution unit will, and in an embodiment does, use the indicated geometry to determine the geometry that is intersected by a ray, as the ray tracing acceleration data structure traversal only returns an indication of geometry that may be intersected by the ray (e.g. that is present in a volume that the ray intersects (pass into/through), it could be that in fact the ray will not actually intersect any of the indicated geometry. Thus while the determination of any geometry that is intersected by a ray performed by the programmable execution unit may, and typically will, result in the identification of geometry that is actually intersected by the ray, it could be the case that the intersection determination will in fact determine that there is in fact no geometry that is intersected by the ray.

In the case that the ray-geometry intersection determination determines that there is in fact no geometry that is intersected by the ray (e.g. when the ray tracing acceleration data structure traversal operation returns a set of primitives, but none of the primitives is actually intersected by the ray), then the programmable execution unit in an embodiment treats that as a ray tracing intersection "miss" (as discussed above for the situation where the ray tracing acceleration data structure traversal does not identify any intersection for a ray), and then performs an appropriate "miss" "default" operation accordingly.

The determination of which geometry is intersected by the rays is then used by graphics processor to continue the processing (ray tracing/rendering) operations.

For instance, the operations described above can then be (and are) repeated for other groups of rays for the sampling position, and once this is done, the sampling position can then be rendered accordingly, e.g. in the usual way for ray tracing operations.

For any geometry (primitives) that is it determined is actually intersected by a ray, various processing steps can then be taken to determine the effect (e.g. appearance) this should have in the sampling position for which the ray was cast.

Thus, once the geometry that the rays will actually intersect (if any) has been determined, then the programmable execution unit performs further processing for the sampling positions in the frame that the rays correspond to in accordance with the (any) geometry for the scene determined to be intersected by the ray.

The further processing for a sampling position that is performed in this regard can comprise any suitable and desired processing for the sampling position as a result of the ray tracing operation for the ray in question, e.g., and in an embodiment, in accordance with and based on any geometry for the scene that was determined to be intersected by the ray.

The further processing for a sampling position that is performed as a result of the ray tracing operation for a ray is in an embodiment determined and selected in accordance with and based on the geometry of the scene that was determined to be intersected by the ray, and/or in accordance with and based on the particular ray tracing-based rendering process that is being performed (e.g. whether the ray tracing process requires the casting of secondary rays (where it is appropriate to do that), and/or the casting of secondary rays of a particular type, or whether the ray tracing-based rendering is intended to be based solely on the first intersection point that is determined). For example, the further processing could be, and in an embodiment is, based on the determined surface type of the geometry that is intersected, and a predefined operation (e.g. in terms of the casting of any secondary rays) for that surface type.

Other arrangements would, of course, be possible.

In an embodiment, the further processing for a sampling position that can be (and is) performed in accordance with any geometry for the scene determined to be intersected by a ray corresponding to the sampling position comprises triggering the casting of a further (e.g. secondary) ray into the scene for the sampling position in question.

In an embodiment, the further processing for a sampling position in the frame that a ray corresponds to that can be (and is) performed in accordance with any geometry for the scene determined to be intersected by the ray also or instead (and in an embodiment also) comprises rendering (shading) the sampling position for the frame to generate an output data value (colour value) for the sampling position, e.g., and in an embodiment, to be used to display the view of the scene at the sampling position for the frame in question.

Thus, in an embodiment, the further processing for a sampling position in a frame that a ray corresponds to that is performed comprises one of:

triggering the tracing (casting) of a further (e.g. secondary) ray for the sampling position in question; and rendering (shading) the sampling position so as to provide an output colour value for the sampling position for the frame.

Correspondingly, the technology described herein in an embodiment comprises shading the sampling position based on the intersection, and/or casting further rays into the scene based on the intersection.

As discussed above, which of these operations is performed is in an embodiment based on and in accordance with a property or properties of the geometry that was determined to be intersected by the ray, and the particular ray tracing-based rendering process that is being used.

The rendering (shading) of the sampling position can be performed in any suitable and desired manner. In an embodiment, it is performed based on and in accordance with the results of the casting of the ray or rays for the sampling position, and the determined intersected geometry (if any), and/or based on and in accordance with the particular ray tracing-based rendering process that is being performed. For example, the rendering (shading) processing could be, and in an embodiment is, based on the determined surface type of the geometry that is intersected, and a predefined shading operation for that surface type.

The rendering (shading) in an embodiment takes account of all the rays that have been cast for a sampling position and so in an embodiment is based both on the first intersected geometry (and the properties, e.g. surface properties, of that geometry), together with the result of any further (secondary) rays that have been cast for the sampling position, e.g. to determine any lighting, reflection or refraction effects.

Other arrangements would, of course, be possible.

In an embodiment, the rendering (shading) of the sampling position is performed once all of the (desired) rays have been cast for the sampling position (and the geometry intersections (if any) for all of the rays to be cast for the sampling position in question have been determined). (As discussed above, the ray tracing process for a given sampling position may comprise both the determination of any geometry that is intersected by a "primary" ray that has been cast from the sampling position itself, together with the determination of geometry, etc., for any secondary rays that have been cast for the sampling position in question, e.g. as a result of an intersection or intersections determined for the primary ray.)

Thus, in an embodiment, once the final results of the rays (the geometry intersections (if any)) have been determined for a sampling position, the programmable execution unit will then render the sampling position in the frame, (at least) in accordance with any geometry for the scene determined to be intersected by rays that have been cast for the sampling position.

Again, this can be done in any suitable and desired manner, and can use any suitable and desired properties, etc., of the geometry, etc., that is determined to be intersected by a ray or rays for the sampling position.

Once the ray tracing based rendering process has been completed for a sampling position, then that will, and in an embodiment does, as discussed above, generate an appropriate set of output data for the sampling position, e.g., and in an embodiment, in the form of an appropriate set of colour (e.g. RGB) data, for the sampling position.

This will be done for each sampling position in the frame (thus the operation in the manner of the technology described herein is in an embodiment performed for plural, and in an embodiment for each, sampling position of the frame being rendered), so that a final output frame showing a view of the scene to be rendered will be generated, which output frame can then, e.g., be written out to memory and/or otherwise processed for further use, e.g. for display on a suitable display.

The process may then be repeated for a next frame (e.g. the next frame to be displayed), and so on.

In order to perform the ray-primitive intersection testing and any required subsequent processing, the programmable execution unit may, and in an embodiment does, use further information relating to the geometry (e.g. primitives), such as appropriate attributes of the geometry (e.g. primitives), such as their vertex positions, normals, surface type/materials), etc. This may be needed in order to determine the actual intersection (point), and for performing further processing in relation to the sampling position accordingly.

Thus the process in an embodiment uses information regarding the properties of the geometry (e.g. in terms of its surface properties, the surface it belongs to, etc.). This information can be provided in any suitable and desired manner, but in an embodiment indexes/pointers to data structures where the data relating to the properties of the geometry is stored are used.

In an embodiment, these properties (additional attributes) are fetched by the programmable execution unit as appropriate, once an intersection determination has been returned by the ray tracing acceleration data structure traversal operation (e.g. by, as discussed below, executing further program instructions to fetch the required attributes).

It would also or instead be possible, if desired, for the indication of the geometry for the scene to be rendered that may be intersected by the ray that is returned to the programmable execution unit by the ray tracing acceleration data structure traversal operation to, as well as indicating the geometry itself, convey and/or indicate such information regarding the properties of the geometry, e.g. in the form of indexes/pointers to data structure(s) where data relating to the properties of the geometry is stored.

In an embodiment, the ray tracing rendering process supports the use of plural different geometry models, e.g., and in an embodiment, in dependence of the distance of the geometry from the viewpoint (camera), and/or from any lighting for the scene, etc., and the ray tracing acceleration data structure traversal operation returns with the indicated geometry an indication of which one of the different models should be used for the geometry.

The technology described herein can be used for all forms of output that a graphics processor may output. Thus, it may be used when generating frames for display, for render-to-texture outputs, etc. The output from the graphics processor is, in an embodiment, exported to external, e.g. main, memory, for storage and use. Subject to the requirements for operation in the manner of the technology described herein, the graphics processor can otherwise have any suitable and desired form or configuration of graphics processor and comprise and execute any other suitable and desired processing elements, circuits, units and stages that a graphics processor may contain, and execute any suitable and desired form of graphics processing pipeline.

In an embodiment, the graphics processor is part of an overall graphics (data) processing system that includes, e.g., and in an embodiment, a host processor (CPU) that, e.g., executes applications that require processing by the graphics processor. The host processor will send appropriate commands and data to the graphics processor to control it to perform graphics processing operations and to produce graphics processing output required by applications executing on the host processor. To facilitate this, the host processor should, and, in an embodiment does, also execute a driver for the graphics processor and a compiler or compilers for compiling programs to be executed by the programmable execution unit of the graphics processor.

The overall graphics processing system may, for example, include one or more of: a host processor (central processing unit (CPU)), the graphics processor (processing unit), a display processor, a video processor (codec), a system bus, and a memory controller.

The graphics processor and/or graphics processing system may also comprise, and/or be in communication with, one or more memories and/or memory devices that store the data described herein, and/or the output data generated by the graphics processor, and/or store software (e.g. (shader) programs) for performing the processes described herein. The graphics processor and/or graphics processing system may also be in communication with a display for displaying images based on the data generated by the graphics processor.

The technology described herein also extends to an overall graphics processing system and the operation of that system.

The technology described herein can be implemented in any suitable system, such as a suitably configured microprocessor based system. In an embodiment, the technology described herein is implemented in a computer and/or micro-processor based system. The technology described herein is in an embodiment implemented in a portable device, such as, and in an embodiment, a mobile phone or tablet.

The various functions of the technology described herein can be carried out in any desired and suitable manner. For example, the functions of the technology described herein can be implemented in hardware or software, as desired. Thus, for example, unless otherwise indicated, the various functional elements, stages, and units of the technology described herein may comprise a suitable processor or processors, controller or controllers, functional units, circuitry, circuits, processing logic, microprocessor arrangements, etc., that are operable to perform the various functions, etc., such as appropriately dedicated hardware elements (processing circuitry/circuits), and/or programmable hardware elements (processing circuitry/circuits) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages, etc., may share processing circuitry/circuits, etc., if desired.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a display processor, or microprocessor system comprising a data processor causes in conjunction with said data processor said controller or system to carry out the steps of the methods of the technology described herein. Such a computer software carrier could be a physical storage intermediate such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory intermediate, such as a computer readable intermediate, for example, diskette, CD ROM, ROM, RAM, flash memory, or hard disk. It could also comprise a series of computer readable instructions transmittable to a computer system, via a modem or other interface device, over either a tangible intermediate, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable intermediate with accompanying printed or electronic documentation, for example, shrink wrapped software, preloaded with a computer system, for example, on a system ROM or fixed disk, or distributed from a server or electronic bulletin board over a network, for example, the Internet or World Wide Web.

The present embodiments relate to the operation of a graphics processor, e.g. in a graphics processing system as illustrated in FIG. 1, when performing rendering of a scene to be displayed using a ray tracing based rendering process.

Ray tracing is a rendering process which involves tracing the paths of rays of light from a viewpoint (sometimes referred to as a "camera") back through sampling positions in an image plane (which is the frame being rendered) into a scene, and simulating the effect of the interaction between the rays and objects in the scene. The output data value e.g. colour of a sampling position in the image is determined based on the object(s) in the scene intersected by the ray passing through the sampling position, and the properties of the surfaces of those objects. The ray tracing process thus involves determining, for each sampling position, a set of objects within the scene which a ray passing through the sampling position intersects.

Figure 2:
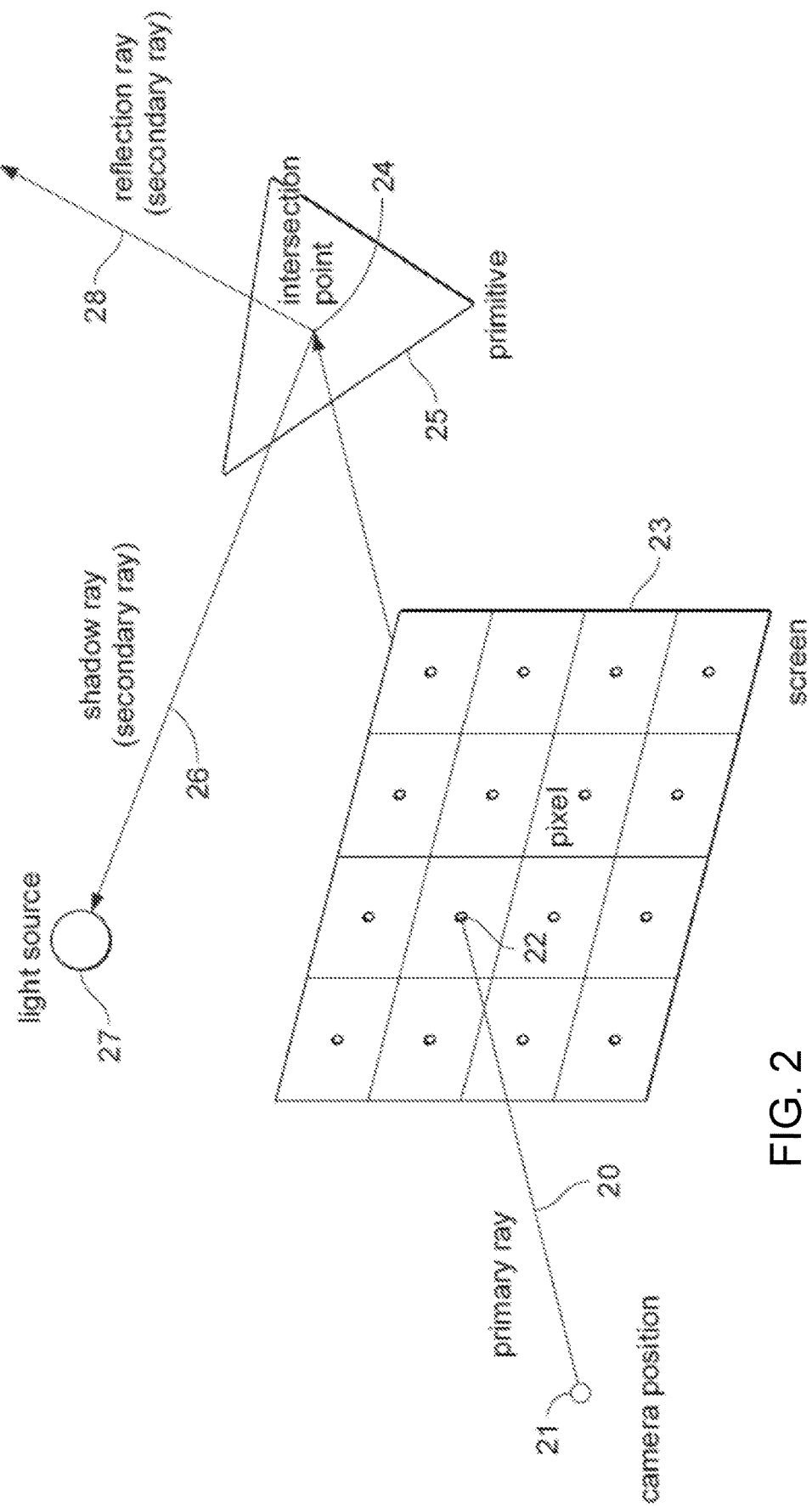
FIG. 2 is a schematic diagram illustrating a "full" ray tracing process.

FIG. 2 illustrates an exemplary "full" ray tracing process. A ray 20 (the "primary ray") is cast backward from a viewpoint 21 (e.g. camera position) through a sampling position 22 in an image plane (frame) 23 into the scene that is being rendered. The point 24 at which the ray 20 first intersects an object 25, e.g. a primitive (which primitives in the present embodiments are in the form of triangles, but may also comprise other suitable geometric shapes), in the scene is identified. This first intersection will be with the object in the scene closest to the sampling position.

A secondary ray in the form of shadow ray 26 may be cast from the first intersection point 24 to a light source 27. Depending upon the material of the surface of the object 25, another secondary ray in the form of reflected ray 28 may be traced from the intersection point 24. If the object is, at least to some degree, transparent, then a refracted secondary ray may be considered.

Such casting of secondary rays may be used where it is desired to add shadows and reflections into the image. A secondary ray may be cast in the direction of each light source (and, depending upon whether or not the light source is a point source, more than one secondary ray may be cast back to a point on the light source).

In the example shown in FIG. 2, only a single bounce of the primary ray 20 is considered, before tracing the reflected ray back to the light source. However, a higher number of bounces may be considered if desired.

The output data for the sampling position 22 i.e. a colour value (e.g. RGB value) thereof, is then determined taking into account the interactions of the primary, and any secondary, ray(s) cast, with objects in the scene. The same process is conducted in respect of each sampling position to be considered in the image plane (frame) 23.

In order to facilitate such ray tracing processing, in the present embodiments acceleration data structures indicative of the geometry (e.g. objects) in scenes to be rendered are used when determining the intersection data for the ray(s) associated with a sampling position in the image plane to identify a subset of the geometry which a ray may intersect.

The ray tracing acceleration data structure represents and indicates the distribution of geometry (e.g. objects) in the scene being rendered, and in particular the geometry that falls within respective (sub-) volumes in the overall volume of the scene (that is being considered). In the present embodiments, ray tracing acceleration data structures in the form of Bounding Volume Hierarchy (BVH) trees are used.

Figure 3:
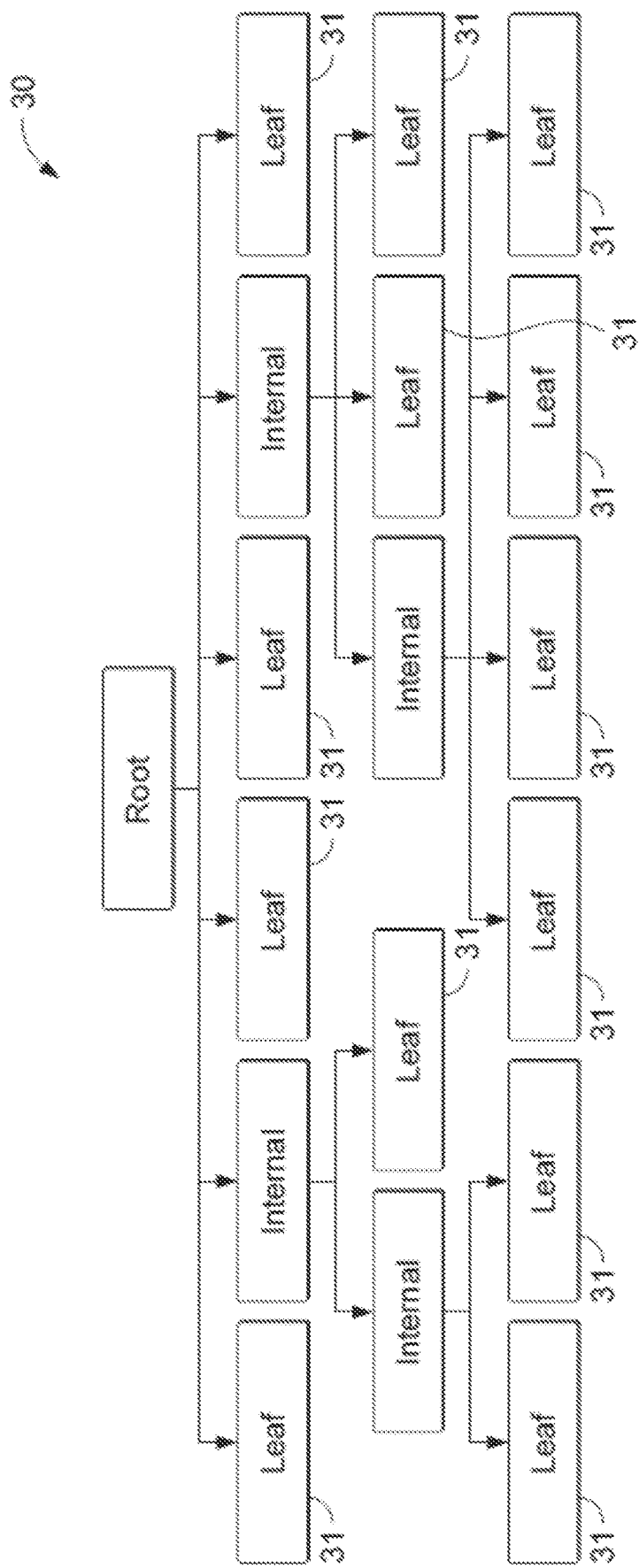
FIG. 3 shows an exemplary ray tracing acceleration data structure.

FIG. 3 shows an exemplary BVH tree 30, constructed by enclosing the complete scene in an axis-aligned bounding volume (AABV), e.g. a cube, and then recursively subdividing the bounding volume into successive sub-AABVs according to any suitable and desired, and, e.g. various, subdivision schemes (e.g. same number of objects per child, based on traversal cost, etc.), until a desired smallest subdivision (volume) is reached.

In this example, the BVH tree 30 is a relatively 'wide' tree wherein each bounding volume is subdivided into up to six sub-AABVs. However, in general, any other suitable tree structure may be used, and a given node of the tree may have any suitable and desired number of child nodes.

Thus, each node in the BVH tree 30 will have a respective volume of the scene being rendered associated with it, with the end, leaf nodes 31 each representing a particular smallest subdivided volume of the scene, and any parent node representing, and being associated with, the volume of its child nodes. Each leaf node will also correspondingly be associated with the geometry defined for the scene that falls, at least in part, within the volume that the leaf node corresponds to (e.g. whose centroid falls within the volume in question), with the leaf nodes 31 representing unique (non-overlapping) subsets of primitives defined for the scene falling within the corresponding volumes for the leaf nodes 31. The BVH tree acceleration data structure also stores (either for the nodes themselves or otherwise, e.g. as sideband information), appropriate information to allow the tree to be traversed volume-by-volume on the basis of the origin and direction of a ray so as to be able to identify a leaf node representing a volume that the ray passes through.

This then allows and facilitates testing a ray against the hierarchy of bounding volumes in the BVH tree until a leaf node is found. It is then only necessary to test the geometry associated with the particular leaf node for intersection with the ray.

Figure 4:
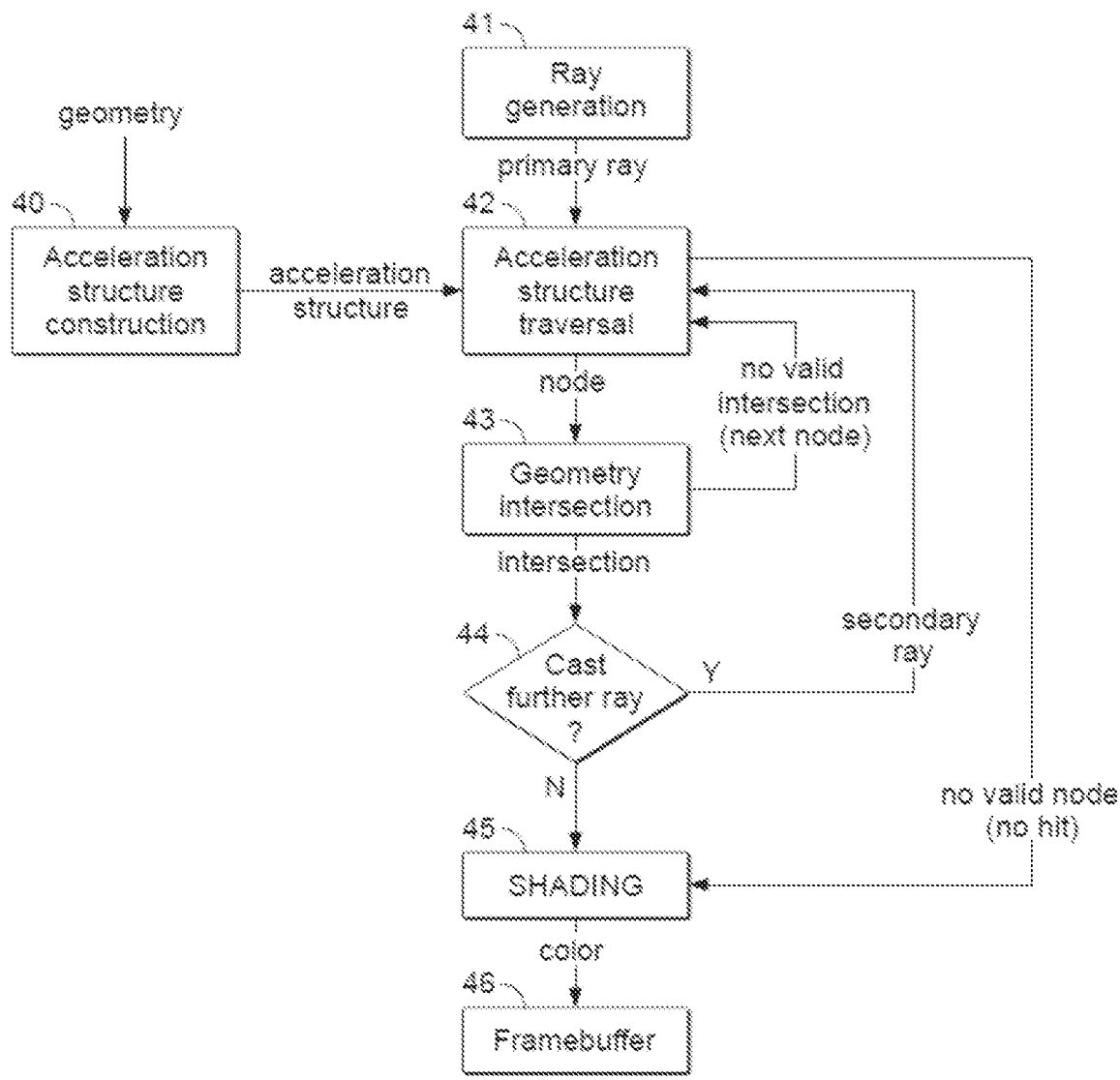
FIG. 4 is a flow chart illustrating an embodiment of a full ray tracing process.

FIG. 4 is a flow chart showing the overall ray tracing process in embodiments of the technology described herein, and that will be performed on and by the graphics processor 2.

First, the geometry of the scene is analysed and used to obtain an acceleration data structure (step 40), for example in the form of a BVH tree structure, as discussed above. This can be done in any suitable and desired manner, for example by means of an initial processing pass on the graphics processor 2.

A primary ray is then generated, passing from a camera through a particular sampling position in an image plane (frame) (step 41). The acceleration data structure is then traversed for the primary ray (step 42), and the leaf node corresponding to the first volume that the ray passes through which contains geometry which the ray potentially intersects is identified. It is then determined whether the ray intersects any of the geometry, e.g. primitives, (if any) in that leaf node (step 43).

If no (valid) geometry which the ray intersects can be identified in the node, the process returns to step 42, and the ray continues to traverse the acceleration data structure and the leaf node for the next volume that the ray passes through which may contain geometry with which the ray intersects is identified, and a test for intersection performed at step 43.

This is repeated for each leaf node that the ray (potentially) intersects, until geometry that the ray intersects is identified When geometry that the ray intersects is identified, it is then determined whether to cast any further (secondary) rays for the primary ray (and thus sampling position) in question (step 44). This may be based, e.g., and in an embodiment, on the nature of the geometry (e.g. its surface properties) that the ray has been found to intersect, and the complexity of the ray tracing process being used. Thus, as shown in FIG. 4, one or more secondary rays may be generated emanating from the intersection point (e.g. a shadow ray(s), a refraction ray(s) and/or a reflection ray(s), etc.). Steps 42, 43 and 44 are then performed in relation to each secondary ray.

Once there are no further rays to be cast, a shaded colour for the sampling position that the ray(s) correspond to is then determined based on the result(s) of the casting of the primary ray, and any secondary rays considered (step 45), taking into account the properties of the surface of the object at the primary intersection point, any geometry intersected by secondary rays, etc. The shaded colour for the sampling position is then stored in the frame buffer (step 46).

If no (valid) node which may include geometry intersected by a given ray (whether primary or secondary) can be identified in step 42 (and there are no further rays to be cast for the sampling position), the process moves to step 45, and shading is performed. In this case, the shading is in an embodiment based on some form of "default" shading operation that is to be performed in the case that no intersected geometry is found for a ray. This could comprise, e.g., simply allocating a default colour to the sampling position, and/or having a defined, default geometry to be used in the case where no actual geometry intersection in the scene is found, with the sampling position then being shaded in accordance with that default geometry. Other arrangements would, of course, be possible.

This process is performed for each sampling position to be considered in the image plane (frame).

Figure 5:
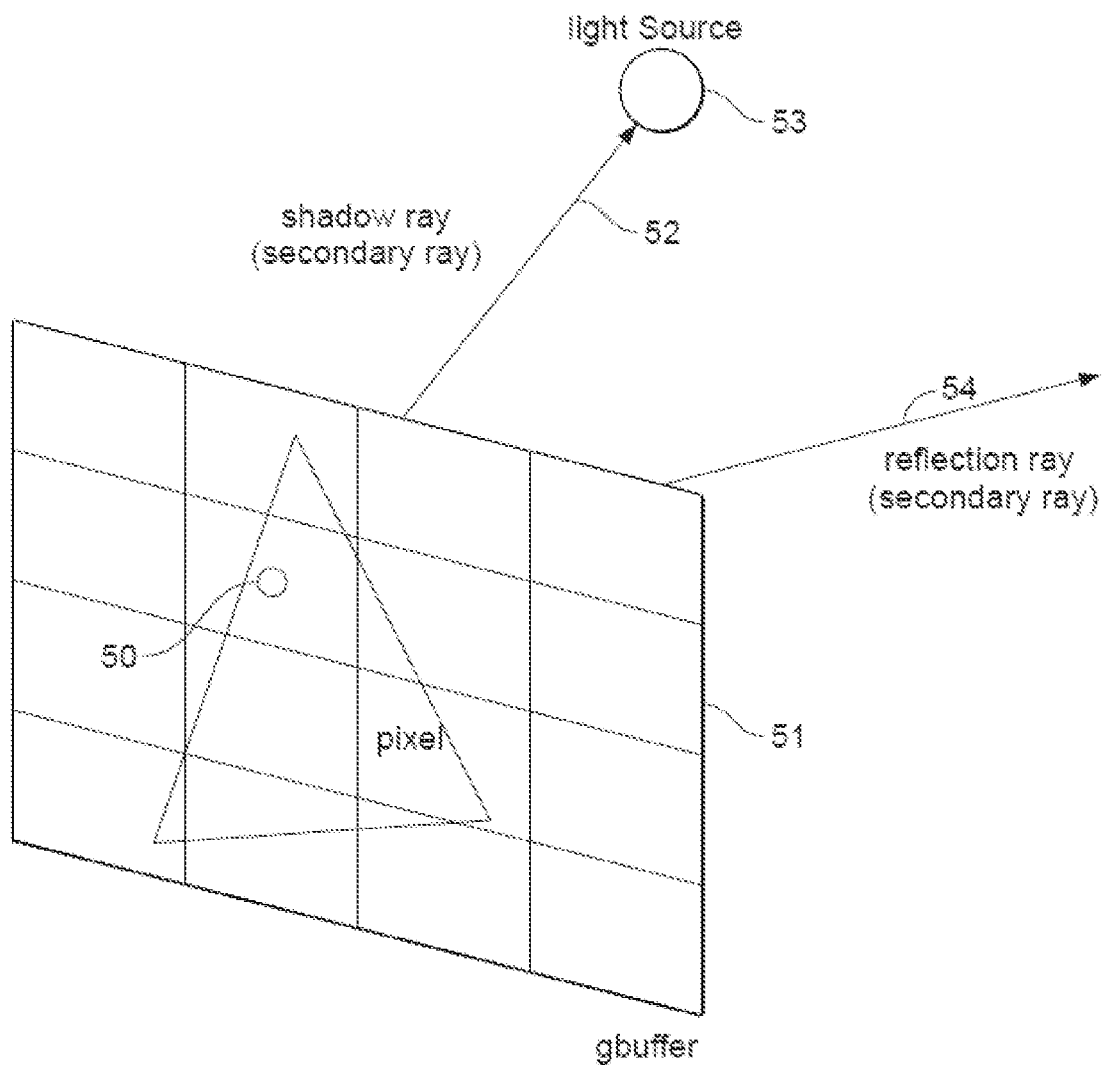
FIG. 5 is a schematic diagram illustrating a "hybrid" ray tracing process.

FIG. 5 shows an alternative ray tracing process which may be used in embodiments of the technology described herein, in which only some of the steps of the full ray tracing process described in relation to FIGS. 3 and 4 are performed. Such an alternative ray tracing process may be referred to as a "hybrid" ray tracing process.

In this process, as shown in FIG. 5, the first intersection point 50 for each sampling position in the image plane (frame) is instead determined first using a rasterisation process and stored in an intermediate data structure known as a "G-buffer" 51. Thus, the process of generating a primary ray for each sampling position, and identifying the first intersection point of the primary ray with geometry in the scene, is replaced with an initial rasterisation process to generate the "G-buffer". The G-buffer includes information indicative of the depth, colour, normal and surface properties (and any other appropriate and desired data, e.g. albedo, etc.) for each first (closest) intersection point for each sampling position in the image plane (frame).

Secondary rays, e.g. shadow ray 52 to light source 53, and reflection ray 54, may then be cast starting from the first intersection point 50, and the shading of the sampling positions determined based on the properties of the geometry first intersected, and the interactions of the secondary rays with geometry in the scene.

Referring to the flowchart of FIG. 4, in such a hybrid process, the initial pass of steps 41, 42 and 43 of the full ray tracing process for a primary ray will be omitted, as there is no need to cast primary rays and determine their first intersection with geometry in the scene. The first intersection point data for each sampling position is instead obtained from the G-buffer.

The process may then proceed to the shading stage 45 based on the first intersection point for each pixel obtained from the G-buffer, or where secondary rays emanating from the first intersection point are to be considered, these will need to be cast in the manner described by reference to FIG. 4. Thus, steps 42, 43 and 44 will be performed in the same manner as previously described in relation to the full ray tracing process for any secondary rays.

The colour determined for a sampling position will be written to the frame buffer in the same manner as step 46 of FIG. 4, based on the shading colour determined for the sampling position based on the first intersection point (as obtained from the G-buffer), and, where applicable, the intersections of any secondary rays with objects in the scene, determined using ray tracing.

The present embodiments relate in particular to the operation of a graphics processor when performing ray tracing-based rendering, e.g. as described above with reference to FIGS. 2-4, and in particular to the ray tracing acceleration data structure traversal and geometry intersection (steps 42-43 in FIG. 4) performed as part of the ray tracing operation.

Figure 6:
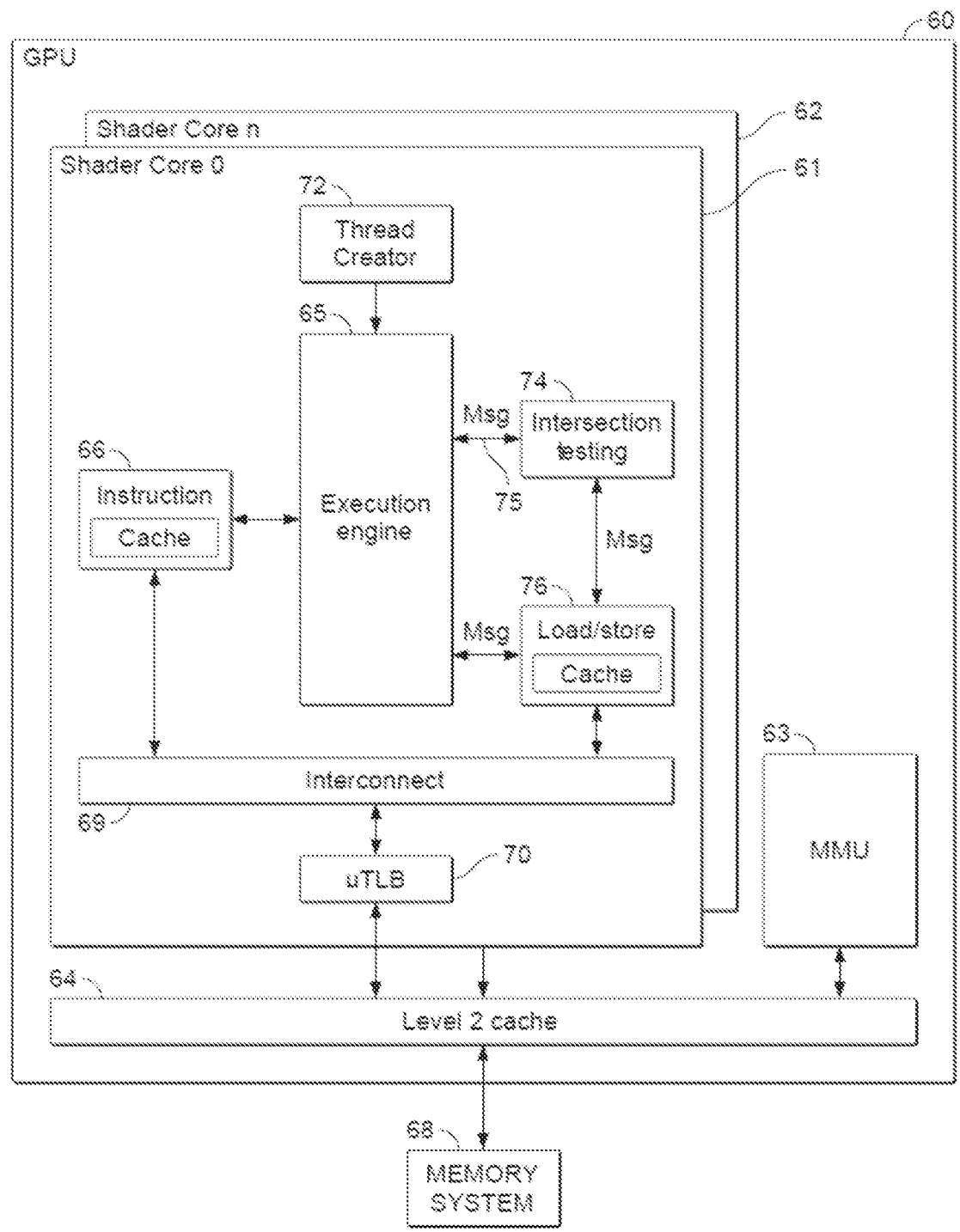
FIG. 6 shows schematically an embodiment of a graphics processor that can be operated in the manner of the technology described herein.

FIG. 6 shows schematically the relevant elements and components of a graphics processor (GPU) 60 of the present embodiments.

As shown in FIG. 6, the GPU 60 includes one or more shader (processing) cores 61, 62 together with a memory management unit 63 and a level 2 cache 64 which is operable to communicate with an off-chip memory system 68 (e.g. via an appropriate interconnect and (dynamic) memory controller).

FIG. 6 shows schematically the relevant configuration of one shader core 61, but as will be appreciated by those skilled in the art, any further shader cores of the graphics processor 60 will be configured in a corresponding manner.

(The graphics processor (GPU) shader cores 61, 62 are programmable processing units (circuits) that perform processing operations by running small programs for each "item" in an output to be generated such as a render target, e.g. frame. An "item" in this regard may be, e.g. a vertex, one or more sampling positions, etc. The shader cores will process each "item" by means of one or more execution threads which will execute the instructions of the shader program(s) in question for the "item" in question. Typically, there will be multiple execution threads each executing at the same time (in parallel).)

FIG. 6 shows the main elements of the graphics processor 60 that are relevant to the operation of the present embodiments. As will be appreciated by those skilled in the art there may be other elements of the graphics processor 60 that are not illustrated in FIG. 6. It should also be noted here that FIG. 6 is only schematic, and that, for example, in practice the shown functional units may share significant hardware circuits, even though they are shown schematically as separate units in FIG. 6. It will also be appreciated that each of the elements and units, etc., of the graphics processor as shown in FIG. 6 may, unless otherwise indicated, be implemented as desired and will accordingly comprise, e.g., appropriate circuits (processing logic), etc., for performing the necessary operation and functions.

As shown in FIG. 6, each shader core of the graphics processor 60 includes an appropriate programmable execution unit (execution engine) 65 that is operable to execute graphics shader programs for execution threads to perform graphics processing operations.

The shader core 61 also includes an instruction cache 66 that stores instructions to be executed by the programmable execution unit 65 to perform graphics processing operations. The instructions to be executed will, as shown in FIG. 6, be fetched from the memory system 68 via an interconnect 69 and a micro-TLB (translation lookaside buffer) 70.

The shader core 61 also includes an appropriate load/store unit 76 in communication with the programmable execution unit 65, that is operable, e.g., to load into an appropriate cache, data, etc., to be processed by the programmable execution unit 65, and to write data back to the memory system 68 (for data loads and stores for programs executed in the programmable execution unit). Again, such data will be fetched/stored by the load/store unit 76 via the interconnect 69 and the micro-TLB 70.

In order to perform graphics processing operations, the programmable execution unit 65 will execute graphics shader programs (sequences of instructions) for respective execution threads (e.g. corresponding to respective sampling positions of a frame to be rendered).

Accordingly, as shown in FIG. 6, the shader core 61 further comprises a thread creator (generator) 72 operable to generate execution threads for execution by the programmable execution unit 65.

As shown in FIG. 6, the shader core 61 in this embodiment also includes an intersection testing circuit 74, which is in communication with the programmable execution unit 65, and which is operable to perform the required ray-volume testing during the ray tracing acceleration data structure traversals (i.e. the operation of step 42 of FIG. 4) for rays being processed as part of a ray tracing-based rendering process, in response to messages 75 received from the programmable execution unit 65.

In the present embodiments the intersection testing circuit 74 is also operable to perform the required ray-primitive testing (i.e. the operation of step 43 of FIG. 4). The intersection testing circuit 74 is also able to communicate with the load/store unit 76 for loading in the required data for such intersection testing.

In the present embodiments, the intersection testing circuit 74 of the graphics processor is a (substantially) fixed-function hardware unit (circuit) that is configured to perform the required ray-volume and ray-primitive intersection testing during a traversal of a ray tracing acceleration data structure to determine geometry for a scene to be rendered that may be (and is) intersected by a ray being used for a ray tracing operation.

Figures 7, 8:
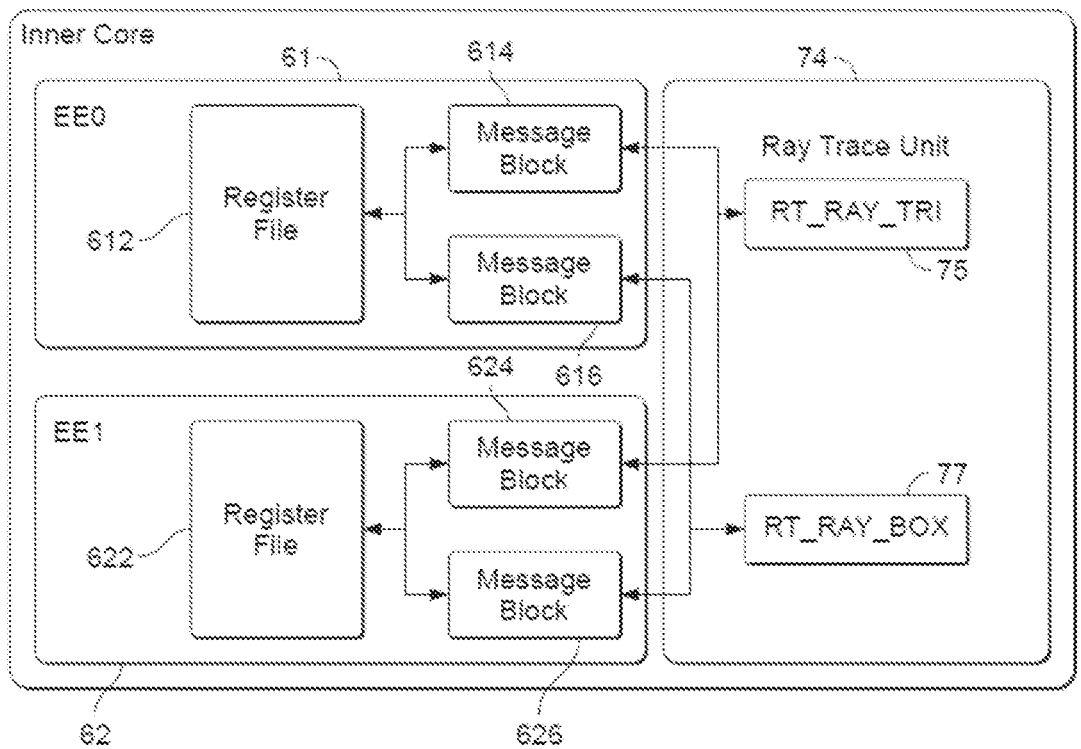
FIG. 7 shows schematically in more detail elements of a graphics processor that can be operated in the manner of the technology described herein.
FIG. 8 shows schematically a stack layout that may be used for managing a ray tracing traversal operation.

FIG. 7 shows in more detail the communication between the intersection testing circuit 74 and the shader cores 61, 62. As shown in FIG. 7, in the present embodiments, the intersection testing circuit 74 includes respective hardware circuits for performing the ray-volume testing (RT_RAY_BOX) 77 and for performing the ray-primitive testing (RT-RAY-TRI) 75. The shader cores 61, 62 thus contain appropriate message blocks 614, 616, 624, 626 for messaging the respective ray-volume testing circuit 77 and ray-primitive testing circuit 75 accordingly when it is desired to perform intersection testing during a traversal operation.

As also shown in FIG. 7, these message blocks communicate with respective register files 612, 622 of the shader cores 61, 62 so that the result of the intersection testing can be written to the register files. In particular, in the present embodiments the traversal operation is managed using a traversal stack that is maintained in a set of shared register files for a group of plural execution threads (a warp) processing rays that are performing the traversal operation.

The operation of the technology described herein can then be (and in the present embodiment is) implemented and triggered by including appropriate 'ray-volume' intersection testing instructions in the ray tracing rendering shader program to be executed by the programmable execution unit that will trigger the desired ray-volume intersection testing to be performed, e.g., and in embodiments, by triggering the execution unit to send an appropriate message to the intersection testing circuit (with the execution unit then sending the message when it reaches (executes) the relevant instruction in the shader program). (Appropriate instructions for causing the execution threads to be in the active state, and also for performing the ray-primitive testing, at least where this is triggered by the same shader program, can also be included appropriately into the shader program).

Such instructions can be included in a shader program to be executed by the programmable execution unit in any suitable and desired manner and by any suitable and desired element of the overall data (graphics) processing system.

For instance, in an embodiment, the "ray-volume" intersection testing instruction is included in the shader program by a compiler (the shader compiler) for the graphics processor. Thus the compiler in an embodiment inserts a "ray-volume" intersection testing instruction at the appropriate point in the ray tracing rendering shader program that is performing the ray tracing.

In an embodiment, a "ray-volume" intersection testing is included in the ray tracing rendering shader program that is to be executed by the graphics processor by the compiler in response to an appropriate ray tracing indication (e.g. a "trace( )" call), included in the (high level) shader program that is provided by the application that requires the graphics processing. Thus, e.g., and in an embodiment, an application program will be able to include an explicit indication of a need for a ray-volume intersection testing instruction in respect of a node during the ray tracing operation, with the compiler then, in the technology described herein, including an appropriate "ray-volume" intersection testing instruction in the compiled shader program in response to that. It may also be possible for the compiler to include "ray-volume" intersection testing instruction of its own accord, e.g. in the case where the compiler is able to assess the shader program being compiled to identify when and where to include a "ray-volume" intersection testing instruction or instructions, even in the absence of an explicit indication of that.

The compiler (the compiler processing circuit) is in an embodiment part of, and in an embodiment executes on, a central processing unit (CPU), such as a host processor, of the graphics processing system, and is in an embodiment part of a driver for the graphics processor that is executing on the CPU (e.g. host processor).

In this case, the compiler and compiled code will run on separate processors within the overall graphics processing system. However, other arrangements would be possible, such as the compiler running on the same processor as the compiled code, if desired.

Thus, in the above embodiment described in relation to FIG. 6 and FIG. 7, the traversal operation is controlled by executing a suitable shader program, but rather than the program performing the entire traversal operation, an intersection testing circuit is in an embodiment provided that performs the actual intersection testing between the rays and the volumes represented by the nodes of the ray tracing acceleration data structure during the traversal. The ray-volume testing instruction when executed by the execution threads in the execution thread group that is performing the traversal for the group of plural rays, thus in an embodiment causes the graphics processor to message an intersection testing circuit to cause the intersection testing circuit to perform the required testing of one or more of the rays in the group of plural rays, Thus, in some embodiments, when the program requires a ray to be tested against a node of the acceleration data structure, as part of the ray tracing operation, the 'ray-volume testing' instruction(s) can be included into the program appropriately, such that when the set of instructions is executed, the execution unit is caused to message the intersection testing circuit and trigger the intersection testing circuit to perform the required intersection testing between the rays and the volumes represented by the nodes of the acceleration data structure.

However, other arrangements would be possible. For example, in other embodiments, the programmable execution unit could perform the full ray tracing ray intersection determination operation, including traversing an acceleration data structure to determine geometry that could be intersected by a ray and then determining whether any geometry is actually intersected by the ray itself. In that case, rather than messaging hardware to perform the intersection testing, the instruction could cause shader program to jump to a suitable sub-routine to implement the required ray-volume intersection testing. As another example, the entire traversal could be performed by a dedicated circuit, rather than the program. Various arrangements would be possible in that regard.

FIG. 8 shows the stack layout in the present embodiments. As shown in FIG. 8, the traversal stack includes a list of entries 80. Each entry is associated with an indication of the next node address to be tested, e.g. in the form of a suitable pointer to the next node address 83. The leaf count 82 field is used to track whether the node corresponds to a leaf node or an internal node and hence whether to trigger ray-volume or ray-primitive testing. Another field 81 is provided that indicates which rays in the group of rays performing the traversal together should be tested for the node in question.

As mentioned above, the traversal stack is in the present embodiments managed for the group of rays as a whole, via a set of shared registers allocated for the execution threads processing the rays. This can therefore help reduce memory bandwidth since the traversal stack can be managed for the group as a whole locally to the graphics processor.

Figure 9:
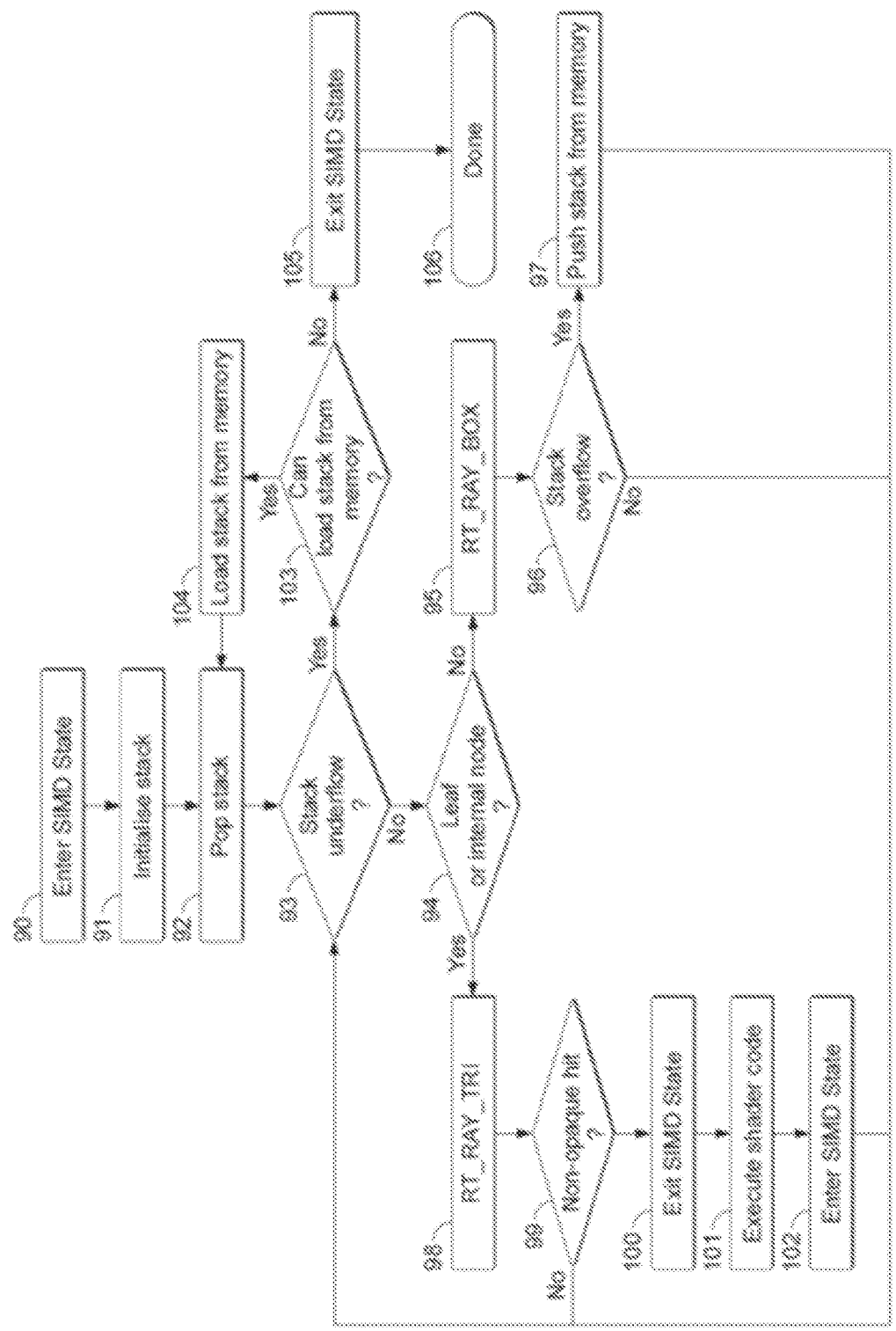
FIG. 9 is a flowchart showing the operation of a graphics processor in an embodiment of the technology described herein.

FIG. 9 is a flowchart showing the operation of a shader core 61 of the graphics processor 60 when performing a ray tracing-based rendering process to render a view of the scene in an embodiment of the technology described herein.

FIG. 9 shows the operation in respect of a given sampling position of the frame being rendered. This operation will be repeated for each sampling position of the frame being rendered, and by each respective shader core that is active and being used to render the frame.

As discussed above, in the present embodiments, sampling positions are rendered by generating respective execution threads for the sampling positions and then executing appropriate shader programs for those threads. Thus, the process will start with the thread creator 72 generating an appropriate execution thread corresponding to the sampling position that is being rendered. The execution thread will then execute an initial ray tracing shader program to perform the ray tracing-based rendering process for the sampling position.

In the present embodiments, the initial ray tracing shader program that is executed for a sampling position will, inter alia, include one or more instructions that when executed trigger the programmable execution unit 65 to send a message 75 to the intersection testing circuit 74 to perform the required ray-volume or ray-primitive intersection testing between the ray in question and a given node of the BVH tree to be tested against.

In the present embodiments, the shader program is executed by a group of plural execution threads (e.g. a warp), with each execution thread performing the traversal operation for a respective ray in a group of plural rays that are thereby caused to perform the traversal operation together, as a whole. To facilitate this, the shader program to perform the traversal operation may include an initial instruction that ensures (forces) all of the execution threads in the group of execution threads to be in an 'active' state, e.g. such that the traversal operation can then be performed using the execution thread group as a whole, e.g. in SIMD execution state.

Thus, as shown in FIG. 9, when, during execution of the initial ray tracing shader program for a sampling position, the programmable execution unit 65 encounters and executes such an 'Enter_SIMD_state" instruction (step 90), at this point it can be ensured that all of the execution threads in the group of execution threads executing the program are in an active (SIMD) state.

The traversal stack that is maintained for the group of execution threads can then be suitably initialised for the traversal operation (step 91).

The first entry in the traversal stack (e.g. the root node) is then popped from the stack in order to start the traversal operation (step 92).

At this point the root node will be the only entry in the traversal stack, such that there will be no stack underflow (step 93—No) and the shader program then proceeds to determine whether the node is leaf node or an internal node (step 94).

For the root node, and other internal nodes encountered during the traversal operation, it is then necessary to perform the required ray-volume intersection testing to determine whether the node represents any geometry that may be intersected by a ray in the group of rays that are performing the traversal operation together. This is done by including into the shader program an appropriate ray-volume testing instruction ('RT_RAY_BOX') that when executed (step 95) by the execution unit will trigger the execution unit to message the ray-volume intersection testing circuit 77 of the intersection testing circuit 74 to perform the desired ray-volume testing.

Figure 10:
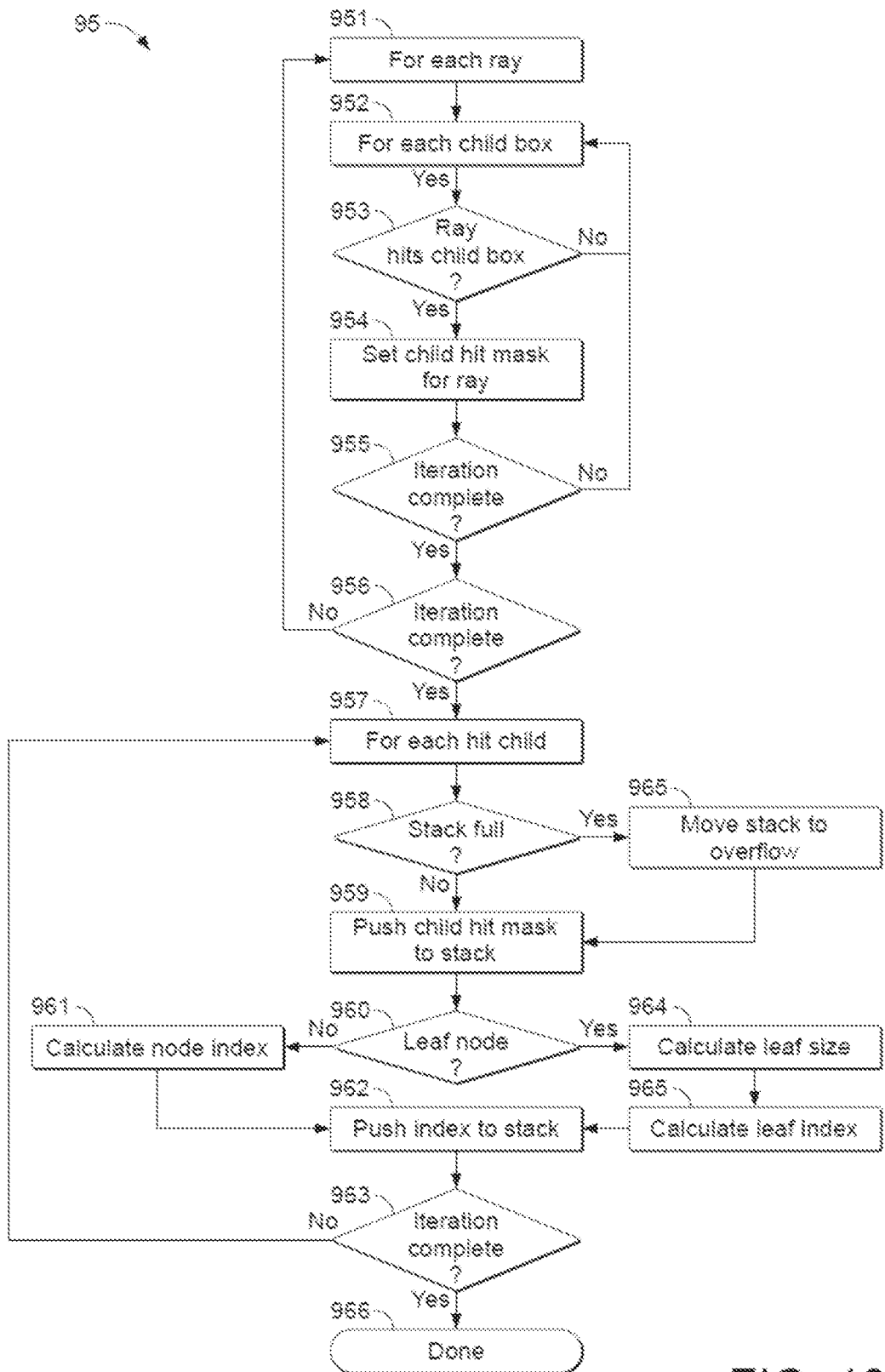
FIG. 10 is a flowchart showing a ray-volume intersection testing operation.

FIG. 10 is a flowchart showing a ray-volume intersection testing operation according to an example.

As shown in FIG. 10, when the ray-volume testing instruction ('RT_RAY_BOX') is executed in respect of a given node in the BVH tree, a first ray in the group of plural rays performing the traversal operation that need to be tested for intersection with the node (as indicated in the appropriate field 81 in the traversal stack) is selected (step 951), and this is then iteratively tested against each child node volume associated with the node in question (step 952).

Thus, for each child node volume (child "box"), it is determined whether the ray intersects with the child volume (step 953), and if the ray does intersect, a hit mask for the child node (field 81 in FIG. 8) is optionally set accordingly to reflect this. If the ray does not intersect the first child node volume, the ray is then tested against the next child node volume, and so on, until the iteration for that ray over the child node volumes is finished (step 955). The testing then iterates over the rays that are to be tested against the node until all of the rays have been tested against all of the child node volumes (step 956).

For each child node volume that was intersected, a result of the intersection testing is then returned, with an appropriate entry being pushed to the traversal stack such that the child node can then be tested accordingly (step 957).

As part of this, it is optionally first tested whether the pushing of the results of the intersection testing would cause the traversal stack to overflow, i.e. because the stack is full (step 958). So long as there are available entries in the traversal stack (step 958—No) a suitable entry is then pushed to the traversal stack, with the entry including the hit mask (field 81 in FIG. 8) for the child node, as well as the leaf count and indication of the child node (fields 82 and 83 in FIG. 8).

For instance, it is then determined whether the child node is a leaf node (step 960). If the node is not a leaf node, a node index can then be calculated indicating which child nodes are associated with the node (step 961) and pushed to the traversal stack accordingly. On the other hand, if the child is a leaf node, the leaf size is then calculated (step 964), and an appropriate leaf index calculated indicating which primitives are represented by the leaf node (step 955) which is then pushed to the traversal stack.

This is done for each child node that was determined as being intersected by a ray (step 963) until respective entries for each child node have been appropriately added into the traversal stack.

The result of the intersection testing is then returned accordingly, and pushed to the traversal stack for the traversal operation. In the event that the result of the intersection testing overflows the traversal stack (step 96—Yes), the entire traversal stack is then pushed to memory (step 97), and an indication of this is recorded into the traversal stack. This can then be checked (at step 93) and in the event that there has been an overflow event (step 93—Yes), it is then checked whether the stack can be loaded from memory (step 103), and if so the stack is then loaded in appropriately (step 104), and the stack entries popped (step 92) so that the traversal operation can continue.

On the other hand, if the stack cannot be loaded from memory, for any reason, in that case the traversal operation may be done (step 106), with the execution thread group first exiting the SIMD state (step 105) accordingly.

The traversal stack can thus be worked through in order to test the various nodes of the BVH tree to determine which nodes represent geometry that may be intersected by the rays in the group of rays performing the traversal operation together.

The technology described herein in particular relates to determining during the ray-volume intersection testing a node traversal order for visiting the child nodes of the parent node being tested that were determined to potentially contain geometry that is intersected by a ray in the group of rays for which the traversal operation is being performed.

For instance, in the FIG. 10 example presented above it will be appreciated that the child nodes are pushed to the traversal stack (step 962) according to the order in which they are tested (in step 957). That is, the order in which the child nodes are pushed to the traversal stack is essentially determined by the order in which they are tested, which will generally be the order in which they are stored in (and hence obtained from) memory. In FIG. 10, no attempt therefore is made to select an order in which hit child nodes are visited.

In contrast, according to the technology described herein, a node traversal order is determined to try to optimise the overall ray tracing traversal operation, as explained above.

Figure 11:
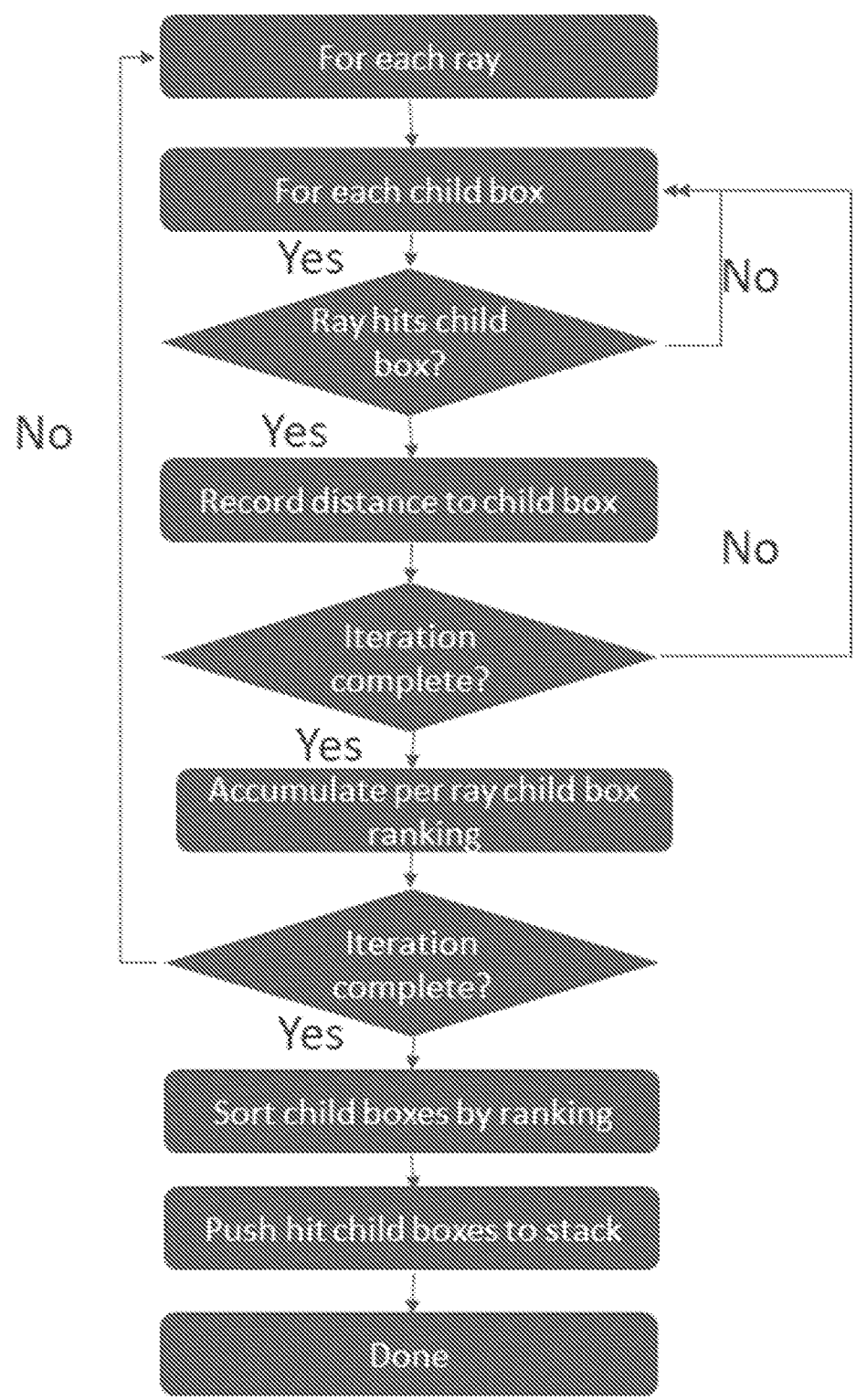
FIG. 11 is a flowchart showing a ray-primitive intersection testing operation.
Figure 12:
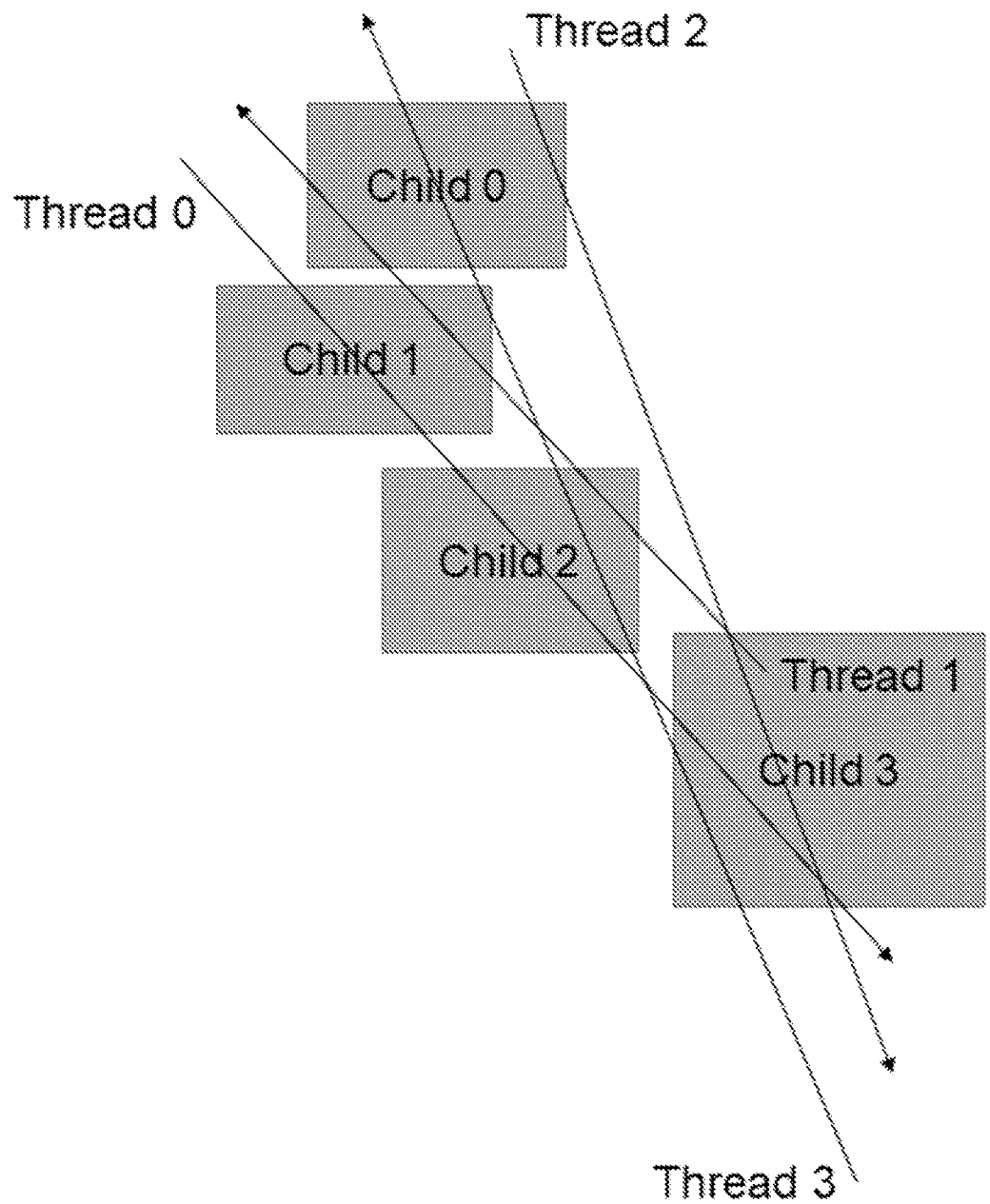
FIG. 12 is a flowchart showing a ray-volume intersection testing operation according to an embodiment.

FIG. 11 in contrast shows further details of the ray-volume intersection testing according to an embodiment.

In FIG. 11 the ray-volume intersection testing is generally triggered in a similar manner as described above in relation to FIG. 10. Thus, as described above, when the ray-volume testing instruction ('RT_RAY_BOX') is executed in respect of a given parent node in the BVH tree, a first ray in the group of plural rays performing the traversal operation that need to be tested for intersection with the node (as indicated in the appropriate field 81 in the traversal stack) is selected (step 951), and this is then iteratively tested against each child node volume (child "box") associated with the parent node in question (step 952).

In the same manner as in FIG. 10, for each child node volume, it is determined whether the ray intersects with the child volume (step 953). As shown in FIG. 11, if the ray does intersect a child volume, the distance from the ray's origin to the child volume is recorded at this point (step 1101). (Optionally a hit mask for the child node can be set at this point as well as described above.) On the other hand, if the ray does not intersect the first child node volume, the ray is then tested against the next child node volume, and so on, until the iteration for that ray over the child node volumes is finished (step 955).

Once the ray has been tested against each of the child node volumes, it is then determined, for that ray, a desired node traversal order (step 1102). Thus, a child volume ranking is accumulated per-ray, with each ray effectively "voting" for its own preferred node traversal order. This may be done in various suitable manners, as will be discussed further below, but in general the desired node traversal order is determined to select, as the first child node to visit, a child node with an increased likelihood of the ray intersecting geometry that means that the ray can then be terminated accordingly.

The testing then continues in the same manner by iterating over the rays in the group of rays that are to be tested against the node until all of the rays have been tested against all of the child node volumes (step 956).

In the embodiment shown in FIG. 11, at this point, the child volumes (that were found to be intersected by at least one ray) are then sorted (step 1103) based on the accumulated per-ray child volume rankings (from step 1102) to determine a desired node traversal order for the group of rays as a whole. The child volumes (indices) are then pushed to the traversal stack accordingly (step 1104) according to the determined node traversal order to cause the traversal to continue by visiting the child nodes according to the determined node traversal order.

It will be appreciated that FIG. 11 merely illustrates some of the steps for the purposes of describing the present embodiment and that various other steps may be performed, as desired. For example, corresponding steps of checking whether the traversal stack is full (step 958 in FIG. 10) may also be performed, as desired, e.g. depending on how the traversal stack is managed.

The effect of this is therefore to sort/rank the child nodes to determine a desired node traversal order, in particular to attempt to optimise the overall ray tracing traversal operation. Various heuristic may be applied in order to rank and sort the child nodes (at steps 1102 and 1103, respectively) to this end. Thus, whilst three examples will now be described in relation to FIG. 13 to illustrate various possible heuristics that may be used to try to optimise the node traversal order, it will be appreciated that various other heuristics, or combinations thereof, may be used according to other examples.

Figure 13:
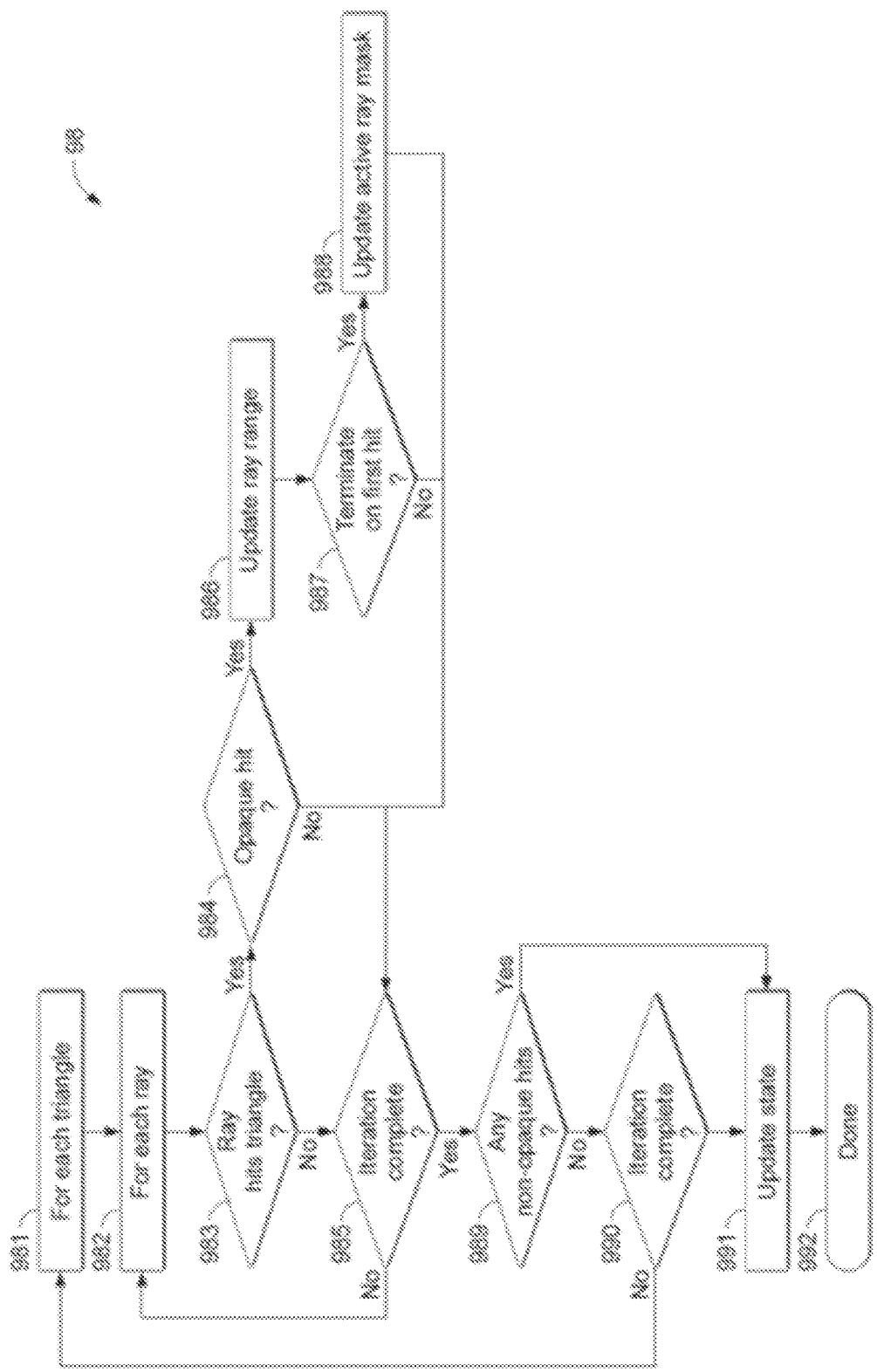
FIG. 13 illustrates an example ray-volume intersection testing operation according to an embodiment.

FIG. 13 shows an example group of rays being tested against a corresponding set of child node volumes. In this example, there are four rays being tested, each corresponding to a respective execution thread ('thread_0', 'thread_1', etc.) and four child node volumes. It will be appreciated that FIG. 13 is merely provided for illustrative purposes and in general there may be any number of rays in a group of rays to be tested and any number of child node volumes.

Example 1—Global Distance

In the first example, the node traversal order is determined based on which of the child node volumes is globally closest to any ray in the group of rays. Thus, in the first example, the heuristic is that the child node whose volume is globally closest to one of the rays in the group of rays is selected as the first node to be visited, the next globally closest child node volume is selected as the second node to be visited, and so on. For instance, as shown in FIG. 11, for each child volume that is intersected by a ray, the distance from the ray's origin to that child volume is recorded (at step 1101). This information can then be used (at step 1103) to rank the hit child nodes such that the child node whose volume is globally closest to a ray is selected to be visited first (and the child node whose volume is next closest is visited second, and so on).

For example, referring to FIG. 13, the first ray (corresponding to 'thread_0') misses the first child node volume ('child_0') but intersects all of the other child node volumes. Of these, it hits the second child node volume (child_1) first. The distance from the origin of the first ray to the second child node volume is '1' (in arbitrary distance units) and this distance is recorded as the closest child node volume for the first ray. Similar analysis can then be performed for the other rays and child node volumes, e.g. as shown in the table below. For instance, considering the next ray (corresponding to 'thread_1') it can be seen that its closest hit child node volume is the fourth child node ('child_3'), as the distance is '0'.

The sorting/ranking process in this example is thus illustrated in the following table;

|  | Child_0 | Child_1 | Child_2 | Child_3 |
|---|---|---|---|---|
| Distance Thread_0 | Miss | 1 | 2 | 3 |
| Distance Thread_1 | 5 | 4 | 3 | 0 |
| Distance Thread_2 | 2 | Miss | Miss | 5 |
| Distance Thread_3 | 10 | 7 | 5 | 3 |
| Shortest Distance | 2 | 1 | 2 | 0 |
| Order | 2 | 1 | 3 | 0 |

From the table above it can be seen that the fourth child node ('child_3') is therefore the globally closest child node to one of the rays in the group and according to the heuristic in this example is selected on that basis to be visited first. In this example, referring to the table below, it can be seen that the second child node ('child_1') has the next shortest distance, and so is visited next, and so on.

Suitable identifiers for the nodes are thus pushed to the traversal stack according to the determined node traversal order to cause the traversal to continue by visiting the child nodes in the node traversal order (although it will be appreciated that the traversal may and typically will visit other nodes in between—for instance, the traversal in this example will continue by visiting the fourth child node ('child_3') first, but the traversal will typically then follow the branch of the tree corresponding to the fourth child node ('child_3') to its end, before visiting the second child node ('child_1') (if necessary)).

Example 2—Top Rank

In the second example, the node traversal order is determined based on which of the child nodes is hit by the greatest number of rays. Thus, according to the heuristic in the second example, each ray votes for its closest child node, and the child node that receives the greatest number of votes is selected to be visited first. The child node that receives the next greatest number of votes is then selected to be visited next, and so on.

The sorting/ranking process in this example is thus illustrated in the following table;

|  | Child_0 | Child_1 | Child_2 | Child_3 |
| --- | --- | --- | --- | --- |
| Distance Thread_0 | Miss | 1 | 2 | 3 |
| Distance Thread_1 | 5 | 4 | 3 | 0 |
| Distance Thread_2 | 2 | Miss | Miss | 5 |
| Distance Thread_3 | 10 | 7 | 5 | 3 |
| Votes Thread_0 | 0 | 1 | 0 | 0 |
| Votes Thread_1 | 0 | 0 | 0 | 1 |
| Votes Thread_2 | 1 | 0 | 0 | 0 |
| Votes Thread_3 | 0 | 0 | 0 | 1 |
| Total Votes | 1 | 1 | 0 | 2 |
| Order | 1 | 2 | 3 | 0 |

According to this example the fourth child node ('child_3') is thus again selected to be visited first (albeit for a different reason). However, the overall node traversal order is different as it is now the first child node ('child_0') that is the determined as the second one of the nodes to be visited, for example.

Example 3—Exponentially Weighted Rank

In the third example, an exponentially weighted ranking is used that considers both the distance to the child nodes and the amount of rays that hit against each child node. In this example, each ray again votes for its closest child node, and the child node that receives the greatest number of votes is selected to be visited first. However, in this example, the votes are exponentially ranked, e.g. such that the closest child node for a particular ray receives '8' votes from that ray, the second closest child node receives '4' votes, and so on (with any child nodes that are not intersected receiving '0' votes).

The sorting/ranking process in this example is thus illustrated in the following table;

|  | Child_0 | Child_1 | Child_2 | Child_3 |
| --- | --- | --- | --- | --- |
| Distance Thread_0 | Miss | 1 | 2 | 3 |
| Distance Thread_1 | 5 | 4 | 3 | 0 |
| Distance Thread_2 | 2 | Miss | Miss | 5 |
| Distance Thread_3 | 10 | 7 | 5 | 3 |
| Votes Thread_0 | 0 | 8 | 4 | 2 |
| Votes Thread_1 | 1 | 2 | 4 | 8 |
| Votes Thread_2 | 8 | 0 | 0 | 4 |
| Votes Thread_3 | 1 | 2 | 4 | 8 |
| Total Votes | 10 | 12 | 12 | 22 |
| Order | 3 | 1 | 2 | 0 |

According to this example the fourth child node ('child_3') is thus also selected to be visited first (albeit for a different reason again). However, the overall node traversal order is different from both of the previous two examples.

Various other examples would of course be possible for ranking/sorting the child nodes to select a node traversal order. For example, in the example shown in FIG. 13, all of the child nodes may themselves be parent nodes. However, in some embodiments, the child nodes associated with a particular parent may comprise a mixture of end (leaf) and non-end (i.e. further parent) child nodes. In that case, the traversal may be configured to always visit 'end' child nodes (that represent actual geometry) first. Various other arrangements would be possible.

The above described embodiments thus attempt to optimise the node traversal order to increase the likelihood of rays hitting (closer) geometry, as this may in turn allow the ray to be shortened, potentially optimising the overall traversal operation. Thus, the result of the heuristics above is to try to increase the likelihood of finding a ray-geometry intersection that allows the ray to be terminated relatively sooner during the traversal operation.

For instance, when the traversal operation reaches a leaf node at the end of given branch of the BVH tree, such that it is determined that the node is leaf node (at step 94), with the traversal operation therefore indicating that the leaf node represents geometry that may be intersected by a ray, the actual geometry intersections are then determined. As mentioned above, any geometry intersections are in an embodiment determined before any further ray-volume intersection testing, such that when the set of child nodes associated with a particular parent comprises a mixture of end (leaf) and non-end (i.e. further parent) child nodes, the end (leaf) nodes are in an embodiment tested first.

The geometry intersection testing (for the leaf (end) nodes) can be done in various ways but in some embodiments this is done by including into the shader program an appropriate instruction ('RT_RAY_TRI') that when executed (step 98) by the execution unit will trigger the execution unit to message the ray-primitive intersection testing circuit 75 of the intersection testing circuit 74 to perform the desired ray-primitive testing.

FIG. 13 is a flowchart showing a ray-primitive intersection testing operation according to an embodiment of the technology described herein.

As shown in FIG. 13, in response to executing the ray-primitive intersection testing ('RT_RAY_TRI') instruction in respect of a leaf node, the set of primitives (e.g. triangles) represented by the leaf node are then loaded for testing.

For each primitive (triangle) represented by the leaf node (step 981), the rays that were determined to intersect the leaf node volume (as indicated by the hit mask, field 81 in FIG. 8) are then iteratively tested against the primitive (step 982) to determine whether or not the ray hits the primitive (step 983). If there are no hits, the next ray is then tested (step 985), and so on, until all of the rays have been tested against the primitive.

For any hits, it is then determined whether there is an 'opaque' hit (step 984). If the ray hits opaque geometry, the ray does not need to propagated further, and so the range can then be updated accordingly (step 986). It can then be determined whether the ray is flagged to terminate on the first hit (step 987). If yes, the hit mask (field 81 in FIG. 8) can be updated appropriately (step 988) and the testing can then move on the next ray.

Once all of the rays have been tested against the (first) primitive, it is then determined whether there were any non-opaque hits (step 989). For any rays that are determined to hit a 'non-opaque' primitive, the ray-primitive testing may need to terminate early, e.g., with the result being returned to the shader program accordingly, such that the shader program can determine how to handle the non-opaque hit (i.e. whether or not the hit needs to be counted). Thus, in the event that there are any non-opaque hits, the ray-primitive testing may be terminated early (without testing any more primitives), with the traversal state being updated accordingly (step 991). In that case, the ray-primitive intersection testing is terminated for all of the rays, such that the group of rays remains together for the traversal operation.

Otherwise, if there are no non-opaque hits, the ray-primitive intersection testing moves on to testing the next primitive (step 990), and iteratively tests the rays in the group of rays for intersection with that primitive, and so on, until all of the primitive for the leaf node have been tested. Once the ray-primitive intersection testing has finished, the traversal state can thus be updated accordingly with the result of the intersection testing (step 991), and the operation is then done (step 992).

The traversal operation thus uses the information provided about the rays to traverse the ray tracing acceleration data structure to determine geometry for the scene to be rendered that may be intersected by the ray in question. In the present embodiments, the traversal process operates to traverse the ray tracing acceleration data structure based on the position and direction of the ray, to determine for each volume of the scene that the ray passes through in turn, whether there is any geometry in the volume (indicated by the ray tracing acceleration data structure), until a first (potential) intersection with geometry defined for the scene is found for the ray.

Other arrangements would, of course, be possible.

The ray tracing acceleration data structure traversal for a ray can comprise traversing a single ray tracing acceleration data structure for the ray, or traversing plural ray tracing acceleration data structures for the ray (e.g. in the case where the overall volume of, and/or geometry for, the scene is represented by plural different ray tracing acceleration data structures, and/or where an initial ray tracing acceleration data structure that indicates further ray tracing acceleration data structures to be traversed is first traversed).

Once the ray tracing acceleration data structure traversal operation 74 has performed the necessary traversal or traversals for a ray, and determined geometry that is intersected by the ray, that information is returned to the programmable execution unit 65, for the programmable execution unit to perform further processing for the sampling position in question as a result of, and based on, the result of the determined traversal for the ray.

For instance, in the present embodiments, the programmable execution unit 65 may then execute further "surface processing" shader programs that will perform further processing for the sampling position in question based on the result of the ray tracing acceleration data structure traversal for the ray.

In the present embodiments, there are plural different sets of further "surface processing" shader programs that can be executed, in dependence upon the type of geometry that has been determined by the ray tracing acceleration data structure traversal circuit as being intersected by a ray (and in particular in dependence upon the particular surface type (surface property or properties) of the geometry determined by the ray tracing acceleration data structure traversal circuit).

Thus the process operates to select the further "processing" shader program to be executed to perform further processing for the sampling position corresponding to a ray in accordance with the type of geometry (and in particular the surface type), that has been determined by the ray tracing acceleration data structure traversal circuit as being intersected by the ray.

An execution thread may thus be generated that is to execute (and that executes) the selected further "surface processing" shader program for the geometry type in question. The programmable execution unit 65 then executes the selected further shader program for the generated thread (e.g. step 45 in FIG. 4).

Once the final output value for the sampling position in question has been generated, the processing in respect of that sampling position is completed. A next sampling position may then be processed in a similar manner, and so on, until all the sampling positions for the frame have been appropriately shaded. The frame may then be output, e.g. for display, and the next frame to be rendered processed in a similar manner, and so on.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology 10 in various embodiments and with various modifications as are suited to the particular use contemplated. It is intended that the scope be defined by the claims appended hereto.

The invention claimed is:

1. A method of operating a graphics processor when performing ray tracing, wherein the ray tracing uses a ray tracing acceleration data structure indicative of the distribution of geometry to be rendered to determine geometry that may be intersected by a ray being used for a ray tracing operation, the ray tracing acceleration data structure comprising a plurality of nodes, each node representing a respective volume,
 at least one node of the ray tracing acceleration data structure comprising a parent node being associated with a respective set of plural child nodes, wherein the volume represented by the parent node encompasses the respective volumes for each of its plural child nodes;
 the method comprising:
 performing a traversal operation comprising traversing the ray tracing acceleration data structure for a group of plural rays together such that all of the rays in the group of rays visit the nodes of the ray tracing acceleration data structure in the same node order,
 wherein when the traversal operation encounters a parent node, an intersection testing operation is performed for the group of rays in respect of the parent node comprising testing at least one ray in the group of rays for intersection with one or more of the respective volumes for the child nodes associated with the parent node to determine which of the child nodes represent volumes containing geometry that may be intersected by at least one ray in the group of rays,
 the method further comprising:
 when the testing that is performed for the group of rays in respect of a parent node determines that the respective volumes for multiple ones of the child nodes associated with the parent node are intersected:
 determining, based on the group of rays, an order in which the child nodes whose volumes were found to be intersected by at least one ray in the group of rays during the testing of the parent node should be visited, wherein determining the order in which the child nodes should be visited comprises at least selecting a first child node from the child nodes whose volumes were found to be intersected by at least one ray in the group of rays during the testing of the parent node that should be visited first; and the traversal operation continuing by visiting the selected first child node, wherein when the set of child nodes associated with the parent node being tested includes one or more end child nodes representing actual geometry that has been defined for the render output and one or more non-end child nodes that do not represent actual geometry that has been defined for the render output, and wherein the testing that is performed for the group of rays in respect of the parent node determines that the multiple ones of the child nodes whose respective volumes are intersected include one or more end child nodes and one or more non-end child nodes, the traversal operation continues by visiting the end child nodes first.

2. The method of claim 1, wherein the selected first child node is visited next, the traversal operation continuing by testing the group of rays against the selected first child node directly after the testing of the parent node.

3. The method of claim 1, wherein the step of determining, based on the group of rays, an order in which the child nodes whose volumes were found to be intersected by at least one ray in the group of rays during the testing of the parent node should be visited is performed using a hit count based on the number of rays determined to intersect each of the child node volumes.

4. The method of claim 3, wherein determining the order comprises determining the child node that is intersected by the greatest number of rays.

5. The method of claim 1, wherein the step of determining, based on the group of rays, an order in which the child nodes whose volumes were found to be intersected by at least one ray in the group of rays during the testing of the parent node should be visited is performed using a distance between an origin of the at least one ray for which the testing is being performed and one or more of the child node volumes.

6. The method of claim 5, wherein determining the order comprises determining the child node comprises determine which of the child node volumes is closest to the origin of a ray for which the testing is being performed.

7. The method of claim 5, wherein the distances between the origins of the rays and the one or more child node volumes are determined for each ray for which testing is being performed, and wherein the child node whose volume is globally closest to one of the rays for which the testing is being performed is selected as the first child node.

8. The method of claim 5, wherein each ray for which testing is being performed votes for the child node that is closest to the origin of the ray, and the child node with the most votes is selected as the first child node.

9. The method of claim 8, wherein each ray for which testing is being performed ranks the one or more child nodes based on the respective distances from the origin of the ray to the child node volume, and wherein child node rankings for multiple rays are used together to select the first child node.

10. A graphics processor that is operable to perform a ray tracing process, wherein the ray tracing process uses a ray tracing acceleration data structure indicative of the distribution of geometry to be rendered to determine geometry that may be intersected by a ray being used for a ray tracing operation, the ray tracing acceleration data structure comprising a plurality of nodes, each node representing a respective volume, at least one node of the ray tracing acceleration data structure comprising a parent node being associated with a respective set of plural child nodes, wherein the volume represented by the parent node encompasses the respective volumes for each of its plural child nodes;

the graphics processor comprising:

a traversal circuit that is configured to perform, for a group of plural rays, a traversal operation comprising traversing the ray tracing acceleration data structure for the group of plural rays together such that all of the rays in the group of rays visit the nodes of the ray tracing acceleration data structure in the same node order, wherein when the traversal operation encounters a parent node, an intersection testing operation is performed for the group of rays in respect of the parent node comprising testing at least one ray in the group of rays for intersection with one or more of the respective volumes for the child nodes associated with the parent node to determine which of the child nodes represent volumes containing geometry that may be intersected by at least one ray in the group of rays:

the graphics processor further comprising:

a traversal optimisation circuit that is configured to:

when a group of plural rays is performing a traversal of the ray tracing acceleration data structure: and when the testing of rays in the group of plural rays that are performing the traversal together in respect of a parent node determines that the respective volumes for multiple ones of the child nodes associated with the parent node are intersected:

determine, based on the group of rays, an order in which the child nodes whose volumes were found to be intersected by at least one ray in the group of rays during the testing of the parent node should be visited, wherein determining the order in which the child nodes should be visited comprises at least selecting a first child node from the child nodes whose volumes were found to be intersected by at least one ray in the group of rays during the testing of the parent node that should be visited first; and cause the traversal operation to continue by visiting the selected first child node, wherein when the set of child nodes associated with the parent node being tested includes one or more end child nodes representing actual geometry that has been defined for the render output and one or more child nodes that do not represent actual geometry that has been defined for the render output, and wherein the testing that is performed for the group of rays in respect of the parent node determines that the multiple ones of the child nodes whose respective volumes are intersected include one or more end child nodes and one or more non-end child nodes, the traversal optimisation circuit causes the traversal operation to continue by visiting the end child nodes first.

11. The graphics processor of claim 10, wherein the traversal operation is caused to continue by testing the group of rays against the selected first child node directly after the testing of the parent node.

12. The graphics processor of claim 10, wherein the step of determining, based on the group of rays, an order in which the child nodes whose volumes were found to be intersected by at least one ray in the group of rays during the testing of the parent node should be visited is performed using a hit count based on the number of rays determined to intersect each of the child node volumes.

13. The graphics processor of claim 12, wherein determining the order comprises determining the child node that is intersected by the greatest number of rays.

14. The graphics processor of claim 10, wherein the step of selecting, based on the group of rays, a first one of the child nodes whose volume was found to be intersected by at least one ray in the group of rays during the testing of the parent node that the traversal operation should visit first is performed using a distance between an origin of the at least one ray for which the testing is being performed and one or more of the child node volumes.

15. The graphics processor of claim 14, wherein determining the order comprises determining the child node comprises determine which of the child node volumes is closest to the origin of a ray for which the testing is being performed.

16. The graphics processor of claim 14, wherein the distances between the origins of the rays and the one or more child node volumes are determined for each ray for which testing is being performed, and wherein the child node whose volume is globally closest to one of the rays for which the testing is being performed is selected as the first child node.

17. The graphics processor of claim 14, wherein each ray for which testing is being performed votes for the child node that is closest to the origin of the ray, and the child node with the most votes is selected as the first child node, wherein each ray for which testing is being performed ranks the one or more child nodes based on the respective distances from the origin of the ray to the child node volume, and wherein child node rankings for multiple rays are used together to select the first child node.

18. A non-transitory computer readable medium comprising a set of instructions that when executed by a data processor will cause the data processor to perform a method of operating a graphics processor when performing ray tracing, wherein the ray tracing uses a ray tracing acceleration data structure indicative of the distribution of geometry to be rendered to determine geometry that may be intersected by a ray being used for a ray tracing operation, the ray tracing acceleration data structure comprising a plurality of nodes, each node representing a respective volume, at least one node of the ray tracing acceleration data structure comprising a parent node being associated with a respective set of plural child nodes, wherein the volume represented by the parent node encompasses the respective volumes for each of its plural child nodes;

the method comprising:

performing a traversal operation comprising traversing the ray tracing acceleration data structure for a group of plural rays together such that all of the rays in the group of rays visit the nodes of the ray tracing acceleration data structure in the same node order, wherein when the traversal operation encounters a parent node, an intersection testing operation is performed for the group of rays in respect of the parent node comprising testing at least one ray in the group of rays for intersection with one or more of the respective volumes for the child nodes associated with the parent node to determine which of the child nodes represent volumes containing geometry that may be intersected by at least one ray in the group of rays, the method further comprising:

when the testing that is performed for the group of rays in respect of a parent node determines that the respective volumes for multiple ones of the child nodes associated with the parent node are intersected:

determining, based on the group of rays, an order in which the child nodes whose volumes were found to be intersected by at least one ray in the group of rays during the testing of the parent node should be visited, wherein determining the order in which the child nodes should be visited comprises at least selecting a first child node from the child nodes whose volumes were found to be intersected by at least one ray in the group of rays during the testing of the parent node that should be visited first; and the traversal operation continuing by visiting the selected first child node, wherein when the set of child nodes associated with the parent node being tested includes one or more end child nodes representing actual geometry that has been defined for the render output and one or more non-end child nodes that do not represent actual geometry that has been defined for the render output, and wherein the testing that is performed for the group of rays in respect of the parent node determines that the multiple ones of the child nodes whose respective volumes are intersected include one or more end child nodes and one or more non-end child nodes, the traversal operation continues by visiting the end child nodes first.

* * * * *